United States Patent
Ogrinz et al.

(10) Patent No.: US 11,468,713 B2
(45) Date of Patent: Oct. 11, 2022

(54) SYSTEM AND METHOD FOR LEVERAGING A TIME-SERIES OF MICROEXPRESSIONS OF USERS IN CUSTOMIZING MEDIA PRESENTATION BASED ON USERS# SENTIMENTS

(71) Applicant: Bank of America Corporation, Charlotte, NC (US)

(72) Inventors: Michael Emil Ogrinz, Easton, CT (US); Mark Alan Odiorne, Waxhaw, NC (US); Gerard P. Gay, Seattle, WA (US); Jeremiah Wiley Fellows, Centennial, CO (US); Regina Peyfuss, Denver, CO (US); Siddhesh Vinayak Wadikar, Denver, CO (US); Allison Dolores Baker, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/189,463

(22) Filed: Mar. 2, 2021

(65) Prior Publication Data
US 2022/0284227 A1 Sep. 8, 2022

(51) Int. Cl.
*G06V 40/70* (2022.01)
*G06K 9/62* (2022.01)
*G06V 40/16* (2022.01)
*G10L 15/00* (2013.01)
*G06V 40/20* (2022.01)

(52) U.S. Cl.
CPC ............. *G06V 40/70* (2022.01); *G06K 9/628* (2013.01); *G06V 40/171* (2022.01); *G06V 40/172* (2022.01); *G06V 40/176* (2022.01); *G06V 40/28* (2022.01); *G10L 15/00* (2013.01)

(58) Field of Classification Search
CPC .... G06V 40/70; G06V 40/171; G06V 40/172; G06V 40/176; G06V 40/28; G06K 9/628; G10L 15/00
See application file for complete search history.

(56) References Cited

U.S. PATENT DOCUMENTS

| | | |
|---|---|---|
| 5,842,191 A | 11/1998 | Stearns |
| 7,246,081 B2 | 7/2007 | Hill |
| 7,388,971 B2 | 6/2008 | Rice et al. |
| 7,921,036 B1 * | 4/2011 | Sharma .............. G06Q 20/3674 705/52 |
| 8,581,911 B2 | 11/2013 | Becker et al. |
| 8,848,068 B2 | 9/2014 | Pfister et al. |
| 9,330,658 B2 | 5/2016 | Bezar |
| 9,395,810 B2 | 7/2016 | Laughlin |

(Continued)

*Primary Examiner* — Wesley J Tucker

(57) ABSTRACT

A system for customizing media presentation based on user's sentiments is disclosed. The system presents a media item to the user on a platform comprising a website. The system captures a first set of microexpressions of the user reacting to the media item. The system extracts a set of baseline features from the first set of microexpressions. The system determines whether the media item elicits positive or sentiment from the user. If the system determines that the media item elicits positive sentiment from the user, the system classifies the media item into a first class of media items that elicit positive sentiment from the user. The system adjusts contents of the platform to include media items from the first class of media items.

20 Claims, 4 Drawing Sheets

(56) References Cited

U.S. PATENT DOCUMENTS

| | | | |
|---|---|---|---|
| 9,477,290 B2 | 10/2016 | Frank et al. | |
| 9,503,786 B2 * | 11/2016 | el Kaliouby | H04N 21/44218 |
| 9,582,769 B2 | 2/2017 | Thieberger | |
| 9,645,652 B2 | 5/2017 | Kelsey et al. | |
| 9,659,185 B2 | 5/2017 | Elovici et al. | |
| 9,904,356 B2 | 2/2018 | Laughlin et al. | |
| 10,043,063 B1 * | 8/2018 | Perfido | G06Q 50/18 |
| 10,045,737 B2 | 8/2018 | Tzvieli et al. | |
| 10,049,263 B2 | 8/2018 | Hau et al. | |
| 10,049,287 B2 | 8/2018 | Holz et al. | |
| 10,142,276 B2 | 11/2018 | Rapaport et al. | |
| 10,217,121 B2 | 2/2019 | Jain | |
| 10,262,236 B2 | 4/2019 | Lim et al. | |
| 10,289,898 B2 | 5/2019 | el Kaliouby et al. | |
| 10,370,012 B2 | 8/2019 | Brooks et al. | |
| 10,387,898 B2 | 8/2019 | Frank et al. | |
| 10,474,875 B2 * | 11/2019 | Pitre | G06V 40/171 |
| 10,515,199 B2 | 12/2019 | Samadani et al. | |
| 10,515,393 B2 | 12/2019 | Todasco et al. | |
| 10,517,521 B2 | 12/2019 | el Kaliouby et al. | |
| 10,621,879 B2 | 4/2020 | Chetlur et al. | |
| 10,664,741 B2 | 5/2020 | Gibbs et al. | |
| 10,667,697 B2 | 6/2020 | Tzvieli et al. | |
| 10,802,580 B2 | 10/2020 | Sanger et al. | |
| 10,813,619 B2 | 10/2020 | Samec et al. | |
| 10,825,432 B2 | 11/2020 | Yan et al. | |
| 2004/0181145 A1 | 9/2004 | Al Bandar et al. | |
| 2008/0068397 A1 | 3/2008 | Carey et al. | |
| 2008/0260212 A1 | 10/2008 | Moskal et al. | |
| 2009/0285456 A1 * | 11/2009 | Moon | G06V 40/176 382/118 |
| 2010/0266213 A1 * | 10/2010 | Hill | A61B 5/16 382/218 |
| 2012/0219934 A1 | 8/2012 | Nakane et al. | |
| 2014/0221866 A1 | 8/2014 | Quy | |
| 2014/0282651 A1 * | 9/2014 | Baratz | H04N 21/222 725/13 |
| 2015/0058081 A1 | 2/2015 | Frank et al. | |
| 2015/0182113 A1 | 7/2015 | Utter | |
| 2015/0182130 A1 | 7/2015 | Utter | |
| 2016/0330217 A1 | 11/2016 | Gates | |
| 2016/0360970 A1 | 12/2016 | Tzvieli et al. | |
| 2016/0379505 A1 | 12/2016 | el Kaliouby et al. | |
| 2017/0102783 A1 | 4/2017 | Shikii et al. | |
| 2017/0238859 A1 | 8/2017 | Sadowsky et al. | |
| 2017/0293356 A1 | 10/2017 | Khaderi et al. | |
| 2017/0311863 A1 | 11/2017 | Matsunaga | |
| 2018/0268222 A1 | 9/2018 | Sohn et al. | |
| 2018/0341878 A1 | 11/2018 | Azout et al. | |
| 2019/0083212 A1 | 3/2019 | Cowburn et al. | |
| 2019/0101985 A1 | 4/2019 | Sajda et al. | |
| 2019/0122072 A1 | 4/2019 | Cricri et al. | |
| 2019/0147333 A1 | 5/2019 | Kallur Palli Kumar et al. | |
| 2019/0228215 A1 | 7/2019 | Najafirad et al. | |
| 2019/0236614 A1 | 8/2019 | Burgin et al. | |
| 2019/0268660 A1 | 8/2019 | el Kaliouby et al. | |
| 2019/0278378 A1 | 9/2019 | Yan et al. | |
| 2019/0279410 A1 | 9/2019 | Orvalho et al. | |
| 2019/0290127 A1 | 9/2019 | Hanina et al. | |
| 2019/0355128 A1 | 11/2019 | Grauman et al. | |
| 2019/0364089 A1 | 11/2019 | Bist | |
| 2019/0384392 A1 | 12/2019 | Aimone et al. | |
| 2020/0019243 A1 | 1/2020 | Aimone et al. | |
| 2020/0226239 A1 | 7/2020 | Leuthardt et al. | |
| 2020/0314490 A1 * | 10/2020 | el Kaliouby | G06Q 30/0241 |
| 2020/0342979 A1 * | 10/2020 | Sadowsky | A61B 5/165 |

* cited by examiner

SYSTEM AND METHOD FOR LEVERAGING A TIME-SERIES OF MICROEXPRESSIONS OF USERS IN CUSTOMIZING MEDIA PRESENTATION BASED ON USERS# SENTIMENTS

TECHNICAL FIELD

The present disclosure relates generally to interface customization and adaptation, and more specifically to a system and method for leveraging a time-series of microexpressions of users in customizing media presentation based on users' sentiments.

BACKGROUND

Microexpressions represent brief and involuntary emotional users' responses to media stimuli. Microexpressions of each user may uniquely represent the identity of each user.

Current information security and user authentication technologies use multi-factor authentication methods for verifying users and granting users access to their user accounts. For example, validating login credentials may be used for verifying users. However, this method can be compromised by a third party, for example, by cyberattacks, and the third party may access information stored in a user account of a user. The current information security and user authentication technologies are not configured to provide a reliable and efficient solution to detect unauthorized access attempts to user accounts by the third party.

Current media presentation customization technologies are not configured to leverage feedback to customize a platform on which media items are presented to the users. For example, an organization's website may display static media items, such as images and announcements for all employees and clients of the organization, but are not equipped to customize media presentation.

SUMMARY

Microexpressions can be leveraged in a variety of technical fields, including multi-factor authentication and media presentation customization. This disclosure recognizes that previous technologies fail to effectively leverage microexpressions in multi-factor authentication and media presentation customization. The corresponding description below describes 1) systems and methods for leveraging microexpressions in multi-factor authentications; and 2) systems and methods for leveraging microexpressions in media presentation customization based on users' sentiments.

With respect to leveraging microexpressions in multi-factor authentications, current information security and user authentication technologies are not configured to provide a reliable and efficient solution to detect unauthorized attempts to access user accounts by a third party and verify the identity of users attempting to access their user accounts.

The present disclosure contemplates systems and methods for leveraging microexpressions of a user in multi-factor authentications by extracting microexpressions of the user in reaction to training media items, establishing baseline features uniquely identifying the user, and using the baseline features for verifying the identity of the user. In a multi-factor authentication process, an identity of a user may be verified by multiple methods. For example, the user may be asked to provide login credentials to a user account on a website. Upon detecting an attempt to access the user account, the disclosed system may be triggered to verify the identity of the user using microexpressions of the user. To this end, the disclosed system may be pre-trained to identify the user based on their microexpressions.

In the training process, the disclosed system establishes the baseline features of the user reacting to particular training media items. In this process, the disclosed system presents one or more training media items to the user. For example, the training media items may comprise images, videos, audio, and/or text representing training subjects, such as food, kittens, puppies, traffic, nature, landscape scenes, music genre, or any subject that can be presented in a media stimuli for eliciting microexpressions. The disclosed system may capture images and/or videos of the user reacting to the training media items. The disclosed system may further capture an audio sound made by the user reacting to the training media items. The disclosed system processes the captured data (i.e., images, videos, and/or audio sound) and determines microexpressions expressed by the user reacting to the training media items. For example, the disclosed system generates a mesh of datapoints superpositioned on the face of the user, where the datapoints represent locations, shapes, and edges of sub-regions of the face of the user, such as forehead, eyebrows, eyes, nose, cheeks, lips, etc. The microexpressions of the user may represent brief and involuntary emotional responses of the user to media stimuli, e.g., training media items. The microexpressions may correspond to a unique microexpressions fingerprint for the user. From the microexpressions of the user, the disclosed system establishes baseline features of the user, where the baseline features may comprise visual (e.g., facial) features of the user, gestures performed by the user, and auditory features, such as verbal auditory clues comprising at least a word uttered by the user, non-verbal auditory clues from the user comprising laughing, and movements of the user. As such, the disclosed system can use the baseline feature to verify the identity of the user in a multi-factor authentication process. For example, assume that a person is attempting to access a user account associated with the user. In response, the disclosed system is triggered to present one or more test media items to the person. The test media items may be different representations of training media items. The test media items may comprise images, videos, audio, and/or text representing test subjects.

Each test subject may belong to the same category or topic as its corresponding training subject. For example, if the training media items comprise a first set of media items representing a first category, the corresponding test media items comprise a second set of media items representing the first category. For example, if the training media items represent a first set of food items, such as apple pies, the corresponding test media items represent a second set of food items, such as images/videos of cakes, images/videos of apple pies from different angles, and augmented images/videos of apple pies.

In another example, if the training media items represent a first set of landscape scenes, the test media items represent a second set of landscape scenes, such as landscape scenes in locations other than the first set of landscape scenes, the same locations as the first set of landscape scenes but from different angles, and augmented first set of landscape scenes.

The disclosed system captures images and/or videos of the person, and/or audio sound made by the person reacting to the test media items. The disclosed system processes the captured images, videos, and/or audio sound to determine microexpressions expressed by the person reacting to the test media items, similar to as described above with respect to determining microexpressions expressed by the user reacting to the training media items. From the microexpressions of the person, the disclosed system determines test features that represent reactions of the person to the test media items.

The disclosed system determines whether the person is the same as the user if the baseline features (that are associated with the user) correspond to the test features (that are associated with the person). To this end, the disclosed system compares the baseline features with the test features. For example, the disclosed system may compare numerical values representing the baseline features with numerical values representing the test features. The disclosed system determines whether more than a threshold percentage of the numerical values representing the baseline features (e.g., above 80%, 85%, etc.) are within a threshold range (e.g., ±5%, ±10%, etc.) from more than the threshold percentage of the test features. If the disclosed system determines that more than the threshold percentage of the numerical values representing the baseline features are within the threshold range from more than the threshold percentage of the test features, the disclosed system determines that the baseline features correspond to the test features. If the disclosed system determines that the baseline features correspond to the test features, the disclosed system determines that the person is the same as the user, and authenticates the person to access the user account. Otherwise, the disclosed system determines that the person is not the same as the user. In this case, for example, the disclosed system may send an alert to a user device from which the person is attempting to access the user account. In another example, the disclosed system may lock the user account if more than a threshold number of tries for comparing the baseline features with test features of the person within more than a threshold period of time (e.g., five tries in ten minutes, etc.) fail.

In one embodiment, a system for identifying microexpressions comprises a memory and a processor. The memory is operable to store a plurality of training media items that represents one or more training subjects. The plurality of training media items comprises at least one of a first image, a first video, and first audio representing the one or more training subjects. The memory is also operable to store a plurality of test media items, separate from the plurality of training media items, representing one or more test subjects. Each of the one or more test subjects is a different representation of a corresponding training subject from the one or more training subjects. The plurality of test media items comprises at least one of a second image, a second video, and second audio representing the one or more test subjects.

The processor is operably coupled to the memory. The processor is configured to present one or more training media items from the plurality of training media items to a user. The processor captures a first plurality of microexpressions of the user in reaction to the one or more training media items. The processor determines, based at least in part upon the first plurality of microexpressions, a set of baseline features associated with the user indicating reactions of the user to the one or more training media items. The processor presents one or more test media items from the plurality of test media items to a person. The processor captures a second plurality of microexpressions of the person in reaction to the one or more test media items. The processor determines, based at least in part upon the second plurality of microexpressions, a set of test features associated with the person indicating reactions of the person to the one or more test media items. The processor determines whether the set of test features corresponds to the set of baseline features. In response to determining that the set of test features corresponds to the set of baseline features, the processor determines that the person is the same as the user.

The disclosed system provides several practical applications and technical advantages which include: 1) technology that detects microexpressions of a user in reaction to training media items, where the microexpressions of the user correspond to a unique microexpressions fingerprint of the user; 2) technology that generates baseline features from the microexpressions of the user, where the baseline features comprise facial features, movements, gestures of the user reacting to the training media items; and 3) technology that uses the microexpressions and baseline features of the user for identifying the user in a multi-factor authentication process.

As such, the disclosed system may improve the current information security and user authentication technologies by leveraging microexpressions of users. For example, the disclosed system may verify the identity of a user attempting to access their user account based on analyzing their microexpressions, whether or not the user enters correct login credentials to the user account. As such, even if the login credentials to the user account are compromised and a third-party attempts to access the user account of the user, the disclosed system is able to verify that the third-party is not the same as the user, and do not grant the third-party access to the user account of the user. For example, if the disclosed system detects an unauthorized attempt to access the user account associated with the user (i.e., detects that baseline features of the user do not correspond to test features of the third party), the disclosed system may send an alert to a user device from which the unauthorized attempt to access the user account is detected and/or to a phone number associated with the user account. In another example, the disclosed system may lock the user account if more than a threshold number of unauthorized (or failed) attempts to access the user account are detected in a threshold period of time (e.g., above ten failed attempts in five minutes, or any other threshold number of unauthorized attempts in any appropriate threshold period of time).

Accordingly, the disclosed system may be integrated into a practical application of securing the user account associated with the user. As such, information associated with the user account may be kept secured from unauthorized access. The disclosed system may further be integrated into an additional practical application of improving underlying operations of computer systems used for detecting microexpressions, establishing baseline features, establishing test features, authenticating users for accessing their user accounts, and/or reporting an alert in response to detecting unauthorized attempts to access the user accounts. For example, the disclosed system may decrease processing time and resources to perform one or more functions enumerated above that would otherwise be spent using the current information technology and user authentication technologies.

The disclosed system may further be integrated into an additional practical application of improving underlying operations of computer systems tasked to store the information associated with the user account, for example, by securing the user account, the computer systems in which the information associated with the user account is kept secured from unauthorized accesses.

With respect to leveraging microexpressions in media presentation customization, current technologies are not configured to provide a reliable and efficient solution to leverage microexpressions of a user in media presentation customization based on users' sentiments in reacting to various media items. The present disclosure contemplates systems and methods for leveraging microexpressions of a user in media presentation customization based on users' sentiments in reacting to media items presented to the user on a particular platform. For example, the particular platform may comprise at least one of an organization's website, shopping website, an email box, a message board, or any interface on which the first media item can be presented. The media items may comprise an image, a video, audio, and text. In a particular example, the first media item may comprise a message (e.g., an email, a text message, etc.), an announcement, a mission statement, and the like. For example, assume that the user is visiting the particular platform at a first timestamp, where a first media item (e.g., an image, a video, audio, and/or a text) is presented on the particular platform. In one example, the disclosed system may capture one or more images and/or videos from the user reacting to the first media item. In another example, the disclosed system may capture an audio sound made by the user reacting to the first media item. From the captured one or more images, videos, and/or audio sound, the disclosed system captures a first set of microexpressions from the user, comprising visual (e.g., facial) microexpressions, auditory features, such as verbal auditory clues comprising at least a word uttered by the user, non-verbal auditory clues from the user comprising laughing, movements by the user (head tilting, etc.), gestures, etc. The disclosed system extracts a set of baseline features from the first set of microexpressions, where the set of baseline features represents the reaction of the user to the first media item.

The disclosed system determines a corresponding sentiment that is associated with the set of baseline features. In this process, the disclosed system compares the set of baseline features with a training dataset comprising features associated with microexpressions labeled with various sentiments, including positive, negative, and neutral sentiments. The disclosed system may compare numerical values representing the set of baseline features with numerical values representing the features from the training dataset. For example, assuming that the disclosed system determines that more than a threshold percentage of the set of baseline features (e.g., above 80%) correspond to more than the threshold percentage of the features from the training data set that are labeled with the positive sentiment, the disclosed system determines that the set of baseline features is associated with the positive sentiment. In this manner, the disclosed system determines the associations and relationships between the baseline features and their corresponding sentiments expressed by the user.

The disclosed system determines a corresponding sentiment class to which the first media item belongs. In other words, the disclosed system determines a corresponding sentiment that the user expressed reacting to the first media item. For example, if the first media item elicits a positive sentiment (e.g., happiness, joy) from the user, the disclosed system classifies the first media item into a first sentiment class of media items that elicit positive sentiment from the user. In another example, if the first media item elicits a negative sentiment (e.g., sadness) from the user, the disclosed system classifies the first media item into a second sentiment class of media items that elicit negative sentiment from the user. In another example, if the first media item elicits a neutral sentiment from the user, the disclosed system classifies the first media item into a third sentiment class of media items that elicit neutral sentiment from the user.

In one embodiment, the disclosed system may adjust the content of the particular platform to include media items from the first sentiment class of media items that elicit positive sentiment from the user. In one embodiment, the disclosed system may trigger a detectable action in response to determining that one or more users expressed a negative sentiment to one or more particular media items presented on the platform. For example, assume that the one or more users are one or more employees of an organization, and the one or more users expressed negative sentiment to an email sent to the one or more users. Also, assume that other employees of the organization have expressed positive sentiment to that email. In such cases, the disclosed system may determine that the detected negative sentiment from the one or more employees is an anomaly compared to the other employees. As such, the disclosed system may send an applicable notification to managers or supervisors of the one or more employees to address the anomaly, e.g., for example to determine a source or cause of the anomaly.

In one embodiment, a system for customizing media presentation based on user's sentiment includes a memory, a processor, and a camera. The memory is operable to store a plurality of media items comprising at least one of an image, a video, audio, and text. The processor is operably coupled with the memory. The processor presents, at a first timestamp, a first media item from the plurality of media items to a user on a particular platform, wherein the particular platform comprises a website. The camera is operably coupled with the processor and the memory. The camera captures one or more first images of a user reacting to the first media item, in response to presenting the first media item to the user. The camera communicates the one or more first images to the processor. The processor captures, from the one or more first images, a first set of microexpressions of the user reacting to the first media item. The processor extracts a set of baseline features from the first set of microexpressions, indicating a reaction of the user to the first media item. The set of baseline features represents one or more of facial features of the user and a gesture performed by the user reacting to the first media item. The reaction of the user indicates an emotional response of the user to the first media item. The processor determines whether the first media item elicits a positive sentiment or a negative sentiment from the user, based at least in part upon the set of baseline features, where the positive sentiment indicates positive emotions expressed by the user, and the negative sentiment indicates negative emotions expressed by the user. The processor determines that the first media item elicits a positive sentiment from the user. In response to determining that the first media item elicits the positive sentiment from the user, the processor classifies the first media item into a first class of media items that elicit the positive sentiment from the user. The processor adjusts the contents of the particular platform to include media items from the first class of media items such that one or more media items that elicit the positive sentiment from the user are added to the particular platform.

The disclosed system provides several practical applications and technical advantages which include: 1) technology that detects microexpressions of a user reacting to a media item to determine a corresponding user's sentiment class that the media item belongs based on the detected microexpressions, where the corresponding user's sentiment class may indicate an emotion that the user expressed reacting to the media item; 2) technology that uses the detected microexpressions in customizing a platform on which media items are presented to the user, where the platform may comprise an organization's website, a shopping website, an email box, a message board, etc.; and 3) technology that triggers a detectable action in response to determining that one or more users expressed a negative sentiment to one or more particular media items presented on the platform, where the detectable action may comprise sending an applicable notification to the authorized personnel (e.g., managers or supervisors of the one or more users).

As such, the disclosed system may improve the platform or interface customization and adaptation technologies by leveraging microexpressions of users. For example, the disclosed system may use a time-series of microexpressions measured over time to determine users' sentiments for use cases, such as for job satisfaction, reactions to emails, reactions to announcements, etc. The disclosed system may be integrated into a practical application of improving website (and other platforms) development by leveraging feedback from visitors of such platforms, where the feedback from the visitors comprise captured microexpressions of the visitors reacting to the media items presented on such platforms. The disclosed system may further be integrated into an additional practical application of improving underlying operations of computer systems tasked to oversee operations of platforms, including organization's websites, shopping websites, email boxes, message boards, and other interfaces. For, example, by using the feedback received from visitors of these platforms, the development of these platforms may be improved, which in turn, may facilitate more seamless operations of computer systems tasked to oversee operations of these platforms.

The disclosed system may further be integrated into an additional practical application of leveraging microexpressions for purposes other than user identification and authentication, and interface customization and adaptation. For example, the disclosed system may leverage microexpressions for identifying determinants and cues of fatigue and stress, and recommend rest or anxiety breaks to users, thus, improving the productivity of users.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
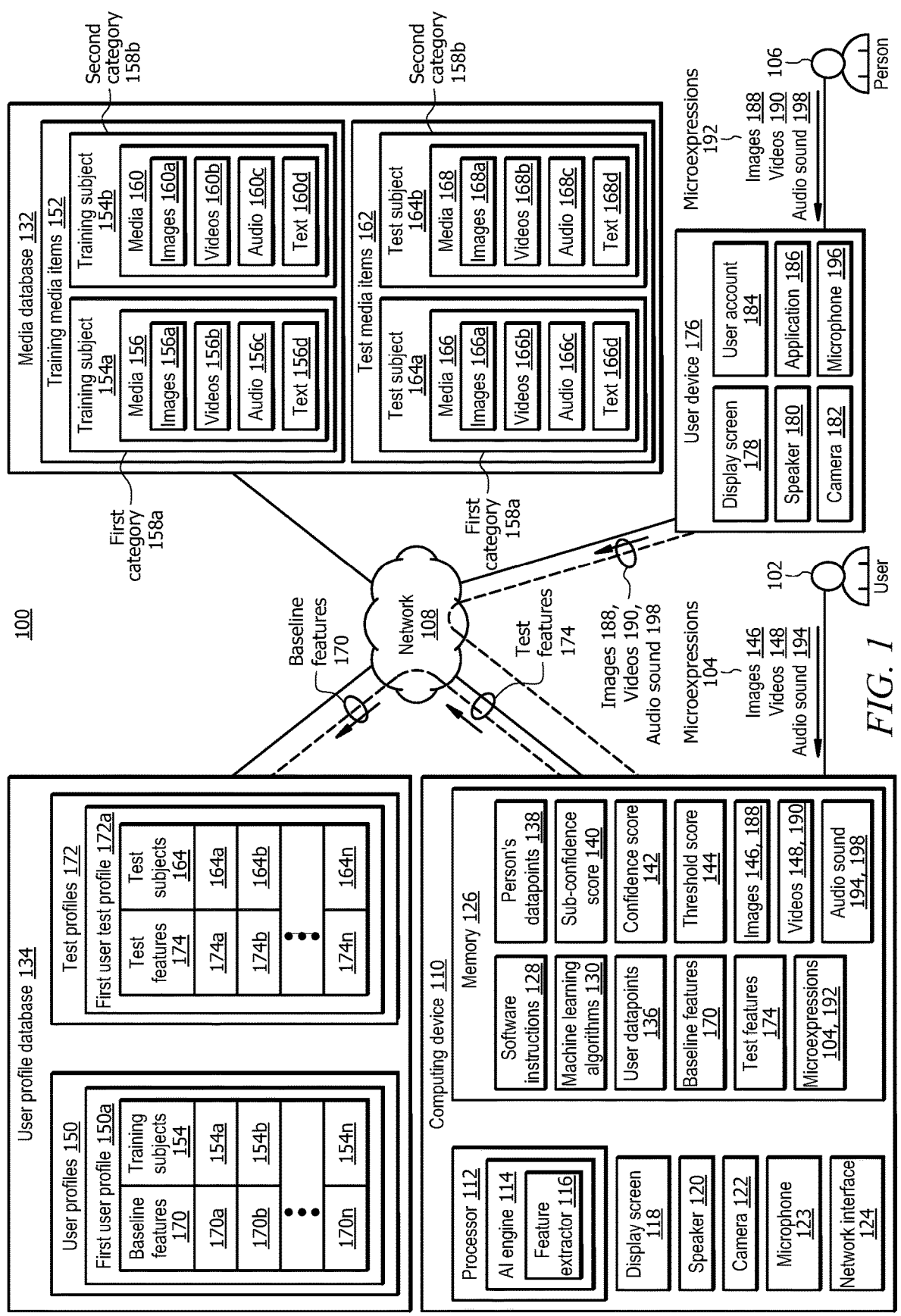
FIG. 1 illustrates an embodiment of a system configured to capture microexpressions expressed by a user, and leverage the microexpressions for authenticating the user.

This disclosure provides various systems and devices for leveraging microexpressions. In one embodiment, a system 100 and a method 200 for leveraging microexpressions in Multi-Factor Authentication (MFA) are described herein with respect to FIGS. 1 and 2, respectively. In one embodiment, a system 300 and a method 400 for leveraging microexpressions in media presentation customization are described herein with respect to FIGS. 3 and 4, respectively.
Example System for Leveraging Microexpressions in Multi-Factor Authentication FIG. 1 illustrates one embodiment of a system 100 that is configured to capture microexpressions expressed by a user 102, and leverage the microexpressions to authenticate the user 102 in a Multi-Factor Authentication (MFA) process. In one embodiment, system 100 comprises a computing device 110, a media database 132, and a user profile database 134. In some embodiments, system 100 may further comprise a user device 176 and a network 108 that establishes communications between components of the system 100. The computing device 110 comprises a processor 112 in signal communication with a memory 126. Memory 126 comprises software instructions 128 that when executed by the processor 112 cause the processor 112 to perform one or more functions described herein. For example, when the software instructions 128 are executed, the processor 112 executes the Artificial Intelligence (AI) engine 114 to capture microexpressions 104 expressed the user 102, extract baseline features 170 from the captured microexpressions 104, and use the baseline features 170 to authenticate the user 102 in an MFA process. The media database 132 stores training media items 152 and test media items 162 that each provide information that may be used by software instructions 128 and/or processor 112. In other embodiments, system 100 may not have all of the components listed and/or may have other elements instead of, or in addition to, those listed above.

In general, system 100 presents one or more training media items 152 to the user 102, for example, from a display screen 118 and/or speaker 120. The training media items 152 represent training subjects 154, such as food, kittens, puppies, traffic, nature, landscape scenes, music genre or any subject that can be presented in a media stimuli for eliciting microexpressions 104. The AI engine 114 receives images 146 and/or videos 148 of the user 102 reacting to the training media items 152, for example, from a camera 122. The AI engine 114 may also receive an audio sound 194 made by the user 102 reacting to the training media items 152, for example, from a microphone 123. The AI engine 114 processes the images 146, videos 148, and/or audio sound 194, and captures a first plurality of microexpressions 104 from the user 102 in reaction to the training media items 152. Based on the microexpressions 104, The AI engine 114 establishes a set of baseline features 170 indicating reactions of the user 102 to the training media items 152. The AI engine 114 can use the set of baseline features 170 to identify and authenticate the user 102 in an MFA process. During the MFA process, the AI engine 114 detects that a person 106 is attempting to access a user account 184 associated with user 102 from a user device 176. The AI engine 114 presents one or more test media items 162 to the person 106, for example, from a display screen 178 and/or speaker 180. The test media items 162 represent test subjects 164 that each may be a different representation of a corresponding training subject 154, that, however, belongs to the same category 158 as its corresponding training subject 154, such as food, kittens, traffic, landscape scenes, etc. For example, assuming that the first category 158a is traffic, the first training subject 154a and the first test subject 164a represent traffic, however, the test media items 166 representing traffic are different than the training media items 156 representing traffic, such as traffic scenes from other locations than the traffic scenes in the test media items 166, traffic scenes from different angles, etc. The AI engine 114 receives one or more images 188 and/or videos 190 of the person 106, and/or an audio sound 198 made by the person 106 reacting to the presented test media items 162, for example, captured by a camera 182 and microphone 196, respectively. The AI engine 114 processes the captured images 188, videos 190, and/or audio sound 198, and captures a second plurality of microexpressions 192 expressed by the person 106 in reaction to the test media items 162. The AI engine 114 determines a set of test features 174 indicating reactions of the person 106 to the test media items 162. The AI engine 114 determines whether the set of test features 174 corresponds to the set of baseline features 170. For example, the AI engine 114 may determine a confidence score 142 that indicates a probability percentage that the set of test features 174 corresponds to the set of baseline features 170. If the AI engine 114 determines that the confidence score 142 is more than a threshold score 144 (e.g., 80%), the AI engine 114 determines that the person 106 is the same as the user 102. Otherwise, the AI engine 114 may determine that the person 106 is not the same as the user 102. As such, system 100 may improve the current MFA technologies by leveraging microexpressions 104, 192.

System Components

Network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art.

Computing device 110 is generally any device that is configured to process data and interact with users. Examples of computing device 110 include, but are not limited to, a personal computer, a desktop computer, a workstation, a server, a laptop, a tablet computer, a mobile phone (such as a smartphone), etc. The computing device 110 is operably coupled with one or more user interfaces including a display screen 118, a speaker 120, and a camera 122. These user interfaces are used in a training process of the AI engine 114 where the AI engine 114 captures microexpressions 104 expressed by a user 102 reacting to one or more training media items 152. This process is described further below. The microexpressions 104 may represent brief and involuntary emotional responses of the user 102 to media stimuli, e.g., training media items 152. The microexpressions 104 may correspond to a unique microexpressions fingerprint for the user 102.

Processor 112 comprises one or more processors operably coupled to the memory 126. The processor 112 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 128) to implement the AI engine 114. In this way, processor 112 may be a special-purpose computer designed to implement the functions disclosed herein. In an embodiment, the processor 112 is implemented using logic units, FPGAs, ASICs, DSPs, or any other suitable hardware. The processor 112 is configured to operate as described in FIGS. 1-2. For example, the processor 112 may be configured to perform one or more steps of method 200 as described in FIG. 2.

Network interface 124 is configured to enable wired and/or wireless communications (e.g., via network 108). The network interface 124 is configured to communicate data between the computing device 110 and other devices, servers, databases (e.g., media database 132 and user profile database 134), systems, or domains. For example, the network interface 124 may comprise a WIFI interface, a local area network (LAN) interface, a wide area network (WAN) interface, a modem, a switch, or a router. The processor 112 is configured to send and receive data using the network interface 124. The network interface 124 may be configured to use any suitable type of communication protocol as would be appreciated by one of ordinary skill in the art.

Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. Memory 126 is operable to store the microexpressions 104, 192, software instructions 128, machine learning algorithms 130, user's datapoints 136, person's datapoints 138, sub-confidence scores 140, confidence scores 142, threshold score 144, images 146, 188, videos 148, 190, audio sounds 194, 198, baseline features 170, test features 174, and/or any other data or instructions. The software instructions 128 may comprise any suitable set of instructions, logic, rules, or code operable to execute the processor 112.

Media database 132 generally comprises any storage architecture. Examples of the media database 132, include, but are not limited to, a network-attached storage cloud, a storage area network, a storage assembly directly (or indirectly) coupled to one or more components of the system 100. The media database 132 stores the training media items 152 and test media items 162. Training media items 152 represent training subjects 154 including a first training subject 154a, a second training subject 154b. The first training subject 154a is represented in media items 156 that include images 156a, videos 156b, and audio 156c. The second training subject 154b is represented in media items 160 that include images 160a, videos 160b, and audio 160c.

Test media items 162 represent test subjects 164 including a first test subject 164a and a second test subject 164b. The first test subject 164a is represented in media items 166 that include images 166a, videos 166b, and audio 166c. The second test subject 164b is represented in media items 168 that include images 168a, videos 168b, and audio 168c. Each test subject 164 and its corresponding training subject 154 belong to the same topic or category 158, such as food, kittens, puppies, traffic, nature, landscape scenes, music genre, etc. However, each test subject 164 is represented differently in test media items 162 than its corresponding training subject 154 represented in the training media items 152. In other words, each test subject 164 is a different representation of its corresponding training subject 154. For example, assuming that the first category 158a is landscape scenes, the first training subject 154a and the first test subject 164a represent landscape scenes. However, the first test subject 164a may comprise different media items representing landscape scenes than the first training subject 154a. For example, if the training media items 156 (from the training media items 152) represent a first set of landscape scenes, the test media items 166 (from the test media items 162) represent a second set of landscape scenes. The second set of landscape scenes may comprise landscape scenes in locations other than the first set of landscape scenes, the same locations as the first set of landscape scenes but from different angles, and an augmented first set of landscape scenes.

In another example, assuming that the second category 158b is food, the second training subject 154b and the second test subject 164b represent food, however, the second test subject 164b may comprise different media items representing food than the second training subject 154b. For example, if the training media items 160 represent a first set of food items, such as apple pies, the test media items 168 represent a second set of food items, such as images/videos of cakes, images/videos of apple pies from different angles, and augmented images/videos of apple pies.

In another example, assuming that the second category 158b is classical music, the second training subject 154b and the second test subject 164b represent classical music, however, the second test subject 164b may comprise different media items representing classical music than the second training subject 154b. For example, if the training media items 160 represent a first set of audio 160c of classical music, the test media items 168 represent a second set of audio 168c of classical music, such as classical music from different artists than the first set of audio 160c and different tracks of the same artists as the first set of audio 160c. The videos and audio in media 156, 160, 166, and 168 may have any duration, such as five seconds, ten seconds, thirty seconds, etc. In one embodiment, the training media items 152 may not overlap with the test media items 162. In another embodiment, the training media items 152 may overlap with the test media items 162. Although in FIG. 1, each of the training media items 152 and test media items 162 comprises two categories 158, it is understood that each of the training media items 152 and test media items 162 may comprise any number of categories 158.

User profile database 134 generally comprises any storage architecture. Examples of the user profile database 134, include, but are not limited to, a network-attached storage cloud, a storage area network, a storage assembly directly (or indirectly) coupled to one or more components of the system 100. The user profile database 134 stores user profiles 150 and test profiles 172. The user profiles 150 includes the first user profile 150a. In the first user profile 150a, baseline features 170 associated with the user 102 are stored. The baseline features 170 may be represented by a feature vector that comprises numerical values that represent microexpressions 104 expressed by the user 102 captured in a training process which is described further below. Each baseline feature 170 is extracted when the user 102 reacts to a different training subject 154. As such, the AI engine 114 may associate each baseline feature 170 to a training subject 154 that the user 102 is reacting to during the baseline feature extraction process which is described below. For example, a first baseline feature 170a is associated with the first training subject 154a, a second baseline feature 170b is associated with the second training subject 154b, and baseline feature 170n is associated with the training subject 154n.

The test profiles 172 includes a first user test profile 172a. In the first user test profile 172a, test features 174 are stored. The test features 174 are associated with a person 106 who is attempting to access a user account 184 associated with the user 102. The test features 174 are extracted when the person 106 is reacting to test media items 162 presented at the user device 176. Each of the test features 174 is associated with a corresponding test subject 164 that the person 106 reacts to, similar to that described above with respect to associating baseline features 170 to training subjects 154.

User device 176 is generally any device that is configured to process data and interact with users. Examples of user device 176 include, but are not limited to, a personal computer, a desktop computer, a workstation, a server, a laptop, a tablet computer, a mobile phone (such as a smartphone), etc. The user device 176 is operably coupled with one or more user interfaces including a display screen 178, a speaker 180, a camera 182, and a microphone 196. These user interfaces are used in an MFA process where the AI engine 114 captures microexpressions 192 expressed by the person 106 reacting to test media items 162. This process is described further below. The microexpressions 192 may represent brief and involuntary emotional responses of the person 106 to media stimuli, e.g., test media items 162. The microexpressions 192 may correspond to a unique microexpressions fingerprint for the person 106. In the user device 176, a web/software/mobile application 186 can be used to present one or more test media items 162 to the person 106. The application 186 may be operably coupled to the AI engine 114. As such, for verifying whether the person 106 is the same as the user 102, the AI engine 114 may fetch one or more test media items 162 from the media database 132, and communicate them to the application 186 to present to the person 106 using the display screen 178 and/or the speaker 180.

AI Engine and its Operations

AI engine 114 may be implemented by the processor 112 executing software instructions 128, and is generally configured to authenticate a user 102 based on their microexpressions 104 in an MFA process. In one embodiment, the AI engine 114 may be implemented using machine learning algorithms 130 such as Support Vector Machine (SVM), Naive Bayes, Logistic Regression, k-Nearest Neighbors, Decision Trees, Principal Component Analysis (PCA), among others. In another embodiment, the AI engine 114 may be implemented using a neural network comprising neural network layers, in which weight and bias values are optimized in the training, testing, and refining processes of the AI engine 114. The AI engine 114 includes a feature extractor 116 that is generally configured to extract the baseline features 170 and test features 174. The corresponding description below describes one or more functions of the AI engine 114.

Establishing Baseline Features of a First User

The AI engine 114 is configured to establish the baseline features 170 of the user 102, where the baseline features 170 are extracted from microexpressions 104 expressed by the user 102 reacting to one or more training media items 152. This process may be referred to as a training process of the AI engine 114, where the AI engine 114 learns the details of the baseline features 170 of the user 102 in reaction to one or more particular training subjects 154. The training process begins when the AI engine 114 presents one or more training media items 152 to the user 102. For example, the AI engine 114 may present one or more training media items 152 to the user 102 using the display screen 118 and/or the speaker 120. The AI engine 114 may present one or more training media items 152 to the user 102 from one or more categories 158 or training subjects 154. During this process, the camera 122 captures one or more images 146 and/or videos 148 from the user 102. For example, prior to presenting the training media items 152 to the user 102, the AI engine 114 may trigger the camera 122 to capture one or more images 146 and/or videos 148 from the user 102. Similarly, the AI engine 114 may also trigger the microphone 123 to capture an audio sound 194 made by the user 102 reacting to the training media items 152. Thus, the AI engine 114 may also receive audio sound 194 made by the user 102.

The camera 122 communicates the captured images 146 and/or videos 148 to the AI engine 114. Similarly, the microphone 123 communicates the captured audio sound 194 to the AI engine 114. The AI engine 114 processes the captured images 146, videos 148, and/or audio sound 194 to determine the microexpressions 104 expressed by user 102 reacting to the presented training media items 152. The AI engine 114 may implement image, video, and audio processing techniques to process the captured images 146, videos 148, and audio sound 194, respectively.

In one embodiment, in this process, the AI engine 114 may capture visual (e.g., facial) microexpressions 104. In this embodiment, the AI engine 114, by implementing the machine learning algorithm 130 that includes image and/or video processing, may detect sub-regions of the face of the user 102, such as forehead, eyebrows, eyes, nose, cheeks, lips, etc. The AI engine 114 may generate a mesh of datapoints 136 super-positioned on the face of the user 102, where the datapoints 136 represent locations, shapes, and edges of the sub-regions on the face of the user 102. In other words, the AI engine 114 may generate a depth map of the face of the user 102, where the mesh of datapoints 136 represents the face of the user 102. In another embodiment, the AI engine 114 may generate a mesh of datapoints 136 representing body parts of the user 102 detected in the images 146 and/or videos 148, including their head, shoulders, hands, etc. In one example, the user's datapoints 136 may be represented in the three-dimension space, where the datapoints are numerical values represented in (x, y, z) planes. In another example, the user's datapoints 136 may be represented in the two-dimensional space, where the datapoints are numerical values presented in (x, y) planes.

To detect microexpressions 104 expressed by the user 102, the AI engine 114 may track the user's datapoints 136 on the face of the user 102 while the user 102 is reacting to the training media items 152. By tracking the user's datapoints 136, the AI engine 114 may detect changes in locations of the user's datapoints 136. The detected changes of the user's datapoints 136 may correspond to the microexpressions 104 expressed by the user 102 reacting to the training media items 152.

In another embodiment, in this process, the AI engine 114 may capture auditory microexpressions. In this embodiment, the AI engine 114, by implementing the machine learning algorithm 130 that includes audio processing, may detect verbal auditory clues comprising at least a word uttered by the user 102, non-verbal auditory clues from the user comprising laughing.

The AI engine 114 (via the feature extractor 116) processes the microexpressions 104 to establish or extract the baseline features 170. In this process, the AI engine 114 may execute the feature extractor 116 by implementing the machine learning algorithms 130. The baseline features 170 may correspond to temporal or sequential relationships between the microexpressions 104. For example, the baseline features 170 may comprise facial features of the user 102, auditory features of the user 102, gestures performed by the user 102, and movements of the user 102 indicating reactions of the user 102 to the training media items 152. In some examples, the facial features of the user 102 may comprise eye size, eye spacing, eyebrow size, eyebrow spacing, eyebrow slant, nose length, nose width, mouth curvature, mouth width, mouth shape, head shape, etc. In some examples, the facial features of the user 102 may comprise facial hair, eyeglasses, jewelry, etc. The auditory features of the user 102 may comprise pitch, frequency, and tone of audio sounds. The gestures performed by the user 102 may comprise expressed emotions, such as laughing, raising eyebrows, frowning, etc. The movements of the user 102 may comprise head movements (e.g., head tilt), shoulder movements, hand movements, hand gestures, etc. Thus, in the training process, the AI engine 114 is trained to establish the baseline features 170 for the user 102 reacting to the presented training media items 152, and associate the baseline features 170 to the user 102.

In one embodiment, the feature extractor 116 may extract a different set of baseline features 170 for each category 158 or training subject 154 that is presented to the user 102. For example, the feature extractor 116 may extract the first baseline feature 170a indicating the reactions of the user 102 to training media items 156 representing the first training subject 154a, and a second baseline feature 170b indicating the reactions of the user 102 to training media items 160 representing the second training subject 154b.

In one embodiment, the AI engine 114 (or the feature extractor 116) may determine a range of baseline features 170 for each training subject 154 presented to the user 102. For example, the AI engine 114 may present a set of training media items 156 representing the first training subject 154a (e.g., food), detect microexpressions 104 expressed by the user 102 reacting to those training media items 156, and establish a range for a first set of baseline features 170a for the user 102. The AI engine 114 may store the baseline features 170 in the first user profile 150a. The AI engine 114 can use the baseline features 170 to identify and authenticate the user 102 in an MFA process described below.

Leveraging Microexpressions in Authenticating the First User

The AI engine 114 may use the baseline features 170 for authenticating the user 102. For example, assume that the person 106 is attempting to access the user account 184 associated with the user 102 from the user device 176. To determine whether the person 106 is the same as the user 102, the AI engine 114 may perform one or more functions described below. In this process, the AI engine 114 determines the test features 174 associated with the person 106, and compares the test features 174 with the baseline features 170 that are associated with the user 102.

This process may be referred to as the MFA process. The MFA process begins when the AI engine 114 detect an attempt by the person 106 to access user account 184, for example, when the person 106 enters login credentials for the user account 184. The AI engine 114 presents one or more test media items 162 to the person 106. The AI engine 114 may present one or more test media items 162 to the person 106 regardless of whether the person 106 enters correct or incorrect login credentials. The AI engine 114 may fetch one or more test media items 162 from the media database 132, and communicate them to the application 186 to be presented to the person 106 on the display screen 178 and/or the speaker 180.

The AI engine 114 selects test media items 162 that are in the same categories 158 as the training subjects 154 used for establishing the baseline features 170 for the user 102. For example, assuming that the training subjects 154 used for establishing the baseline features 170 for the user 102 were kittens, food, and landscape scenes, AI engine 114 selects test media items 162 representing any combination of kittens, food, and landscape scenes. The camera 182 captures one or more images 188 and/or videos 190 from the person 106 reacting to the presented test media items 162 on the user device 176. For example, prior to presenting the test media items 162 to the person 106, the AI engine 114 may trigger the camera 182 to capture one or more images 188 and/or videos 190 from the person 106. The camera 182 communicates the captured images 188 and/or videos 190 to the AI engine 114 via the network 108. Similarly, the AI engine 114 may trigger the microphone 196 to trigger capturing an audio sound 198 made by the person 106. The microphone communicates the audio sound 198 to the AI engine 114.

The AI engine 114 processes the captured images 188, videos 190, and/or audio sound 198 to determine microexpressions 192 expressed by the person 106 reacting to the presented test media items 162. The AI engine 114 may determine the microexpressions 192 expressed by the person 106, similar to that described above with respect to determining the microexpressions 104 expressed by the user 102. For example, the AI engine 114 may capture visual (e.g., facial) microexpressions 192. In this example, the AI engine 114 generates a mesh of datapoints 138 super-positioned on the face of the person 106, where the datapoints 138 represent locations, shapes, and edges of the sub-regions on the face of the person 106. The AI engine 114 may track changes in locations of the person's datapoints 138 to determine the microexpressions 192. In another example, the AI engine 114 may capture auditory microexpressions 192, similar to that described above with respect to capturing auditory microexpressions 104 of the user 102.

The AI engine 114 (via the feature extractor 116) extracts test features 174 from the microexpressions 192, similar to that described above with respect to extracting baseline features 170 from the microexpressions 104 expressed by the user 102. The test features 174 may correspond to temporal or sequential relationships between the microexpressions 192. For example, the test features 174 may comprise facial features of the person 106, auditory features of the person 106, gestures performed by the person 106, and movements of the person 106 indicating reactions of the person 106 to the test media items 162. The feature extractor 116 may extract a first set of test features 174a indicating the reactions of the person 106 to test media items 166 representing the first test subject 164a, and a second set of test features 174b indicating the reactions of the person 106 to test media items 168 representing the second test subject 164b. As such, the feature extractor 116 may associate the first set of test features 174a to the first test subject 164a, associate the second set of test features 174b to the second test subject 164b, and so on.

The AI engine 114 compares the test features 174 with the baseline features 170. In this process, the AI engine 114 compares each test feature 174 with its corresponding baseline feature 170. For example, the AI engine 114 compares the first test feature 174a to the first baseline feature 170a, the second test feature 174b with the second baseline feature 170b, and baseline feature 170n with test feature 174n. For example, the AI engine 114 may perform following operations for each test feature 174. The AI engine 114 identifies a first numerical value representing a test feature 174, and second a numerical value representing a corresponding baseline feature 170. The AI engine 114 compares the first numerical value with the second numerical value. The AI engine 114 determines whether the first numerical value is within a threshold range from the second numerical value. If the AI engine 114 determines that the first numerical value is within the threshold range from the second numerical value, the AI engine 114 determines that the test feature 174 corresponds to the corresponding baseline feature 170. Otherwise, the AI engine 114 determines that the test feature 174 does not correspond with the corresponding baseline feature 170. The AI engine 114 determines whether more than a threshold percentage of the test features 174 (e.g., above 80%, 85%, or any suitable threshold percentage) correspond to the above threshold percentage of the baseline features 170. If the AI engine 114 determines that more than the threshold percentage of the test features 174 correspond with the above threshold percentage of the baseline features 170, the AI engine 114 determines that the test features 174 correspond with the baseline features 170. If the AI engine 114 determines that the test features 174 corresponds with the baseline features 170, the AI engine 114 determines that the user 102 is the same as the person 106.

In each comparison described above, the AI engine 114 determines a sub-confidence score 140 that corresponds to a difference between a numerical value associated with a baseline feature 170 and another numerical value associated with a corresponding test feature 174. Each sub-confidence score 140 may be represented by a probability percentage indicating whether a test feature 174 corresponds to its corresponding baseline feature 170. For example, a sub-confidence score 140 may be 100% if a test feature 174 matches its corresponding baseline feature 170.

In one embodiment, a sub-confidence score 140 may decrease as the difference between a test feature 174 and its corresponding baseline feature 170 increases. For example, if a test feature 174 is 10% smaller (or larger) than its corresponding baseline feature 170, their sub-confidence score 140 may be 90%. In one embodiment, a sub-confidence score 140 may be 0% if a difference between a test feature 174 and its corresponding baseline feature 170 is more than a threshold percentage. For example, if a difference between a test feature 174 and its corresponding baseline feature 170 is above 30%, their sub-confidence score 140 may be 0%. In one embodiment, the AI engine 114 may determine that a test feature 174 corresponds to its corresponding baseline feature 170 if a difference between the test feature 174 and the corresponding baseline feature 170 is within a threshold range, such as within 5%.

The AI engine 114 may determine the confidence score 142 using the sub-confidence scores 140. The confidence score 142 may represent a probability percentage that the test features 174 correspond to (or correspond to more than a threshold percentage of) the baseline features 170. In one embodiment, the AI engine 114 may determine the confidence score 142 by calculating an average of the sub-confidence scores 140. If the AI engine 114 determines that the confidence score 142 is more than a threshold score 144 (e.g., above 80%), the AI engine 114 determines that the test features 174 correspond to the baseline features 170. In one embodiment, the AI engine 114 may determine that the test features 174 correspond to the baseline features 170 if more than a threshold number of sub-confidence scores 140 are more than a threshold percentage. For example, the AI engine 114 may determine that the test features 174 correspond to the baseline features 170 if above 80% of the sub-confidence scores 140 are above 70%. If the AI engine 114 determines that the test features 174 correspond to the baseline features 170, the AI engine 114 determines that the person 106 is the same as the user 102. Otherwise, the AI engine 114 may determine that the person 106 is not the same as the user 102.

In one embodiment, the AI engine 114 may be configured to update the baseline features 170 based on temporal changes in microexpressions 192 compared to microexpressions 104 for each test subject 164, upon validating that the microexpressions 192 belong to the user 102. For example, upon validating that the microexpressions 192 belong to the user 102, if the AI engine 114 detects a gradual temporal change in microexpressions 192 compared to microexpressions 104, the AI engine 114 may update the baseline features 170 accordingly.

In one embodiment, the AI engine 114 may be configured to account for effects of fatigue and stress on the user 102 for authenticating the user 102 in an MFA process. For example, the AI engine 114 may be configured to detect determinants or cues of fatigue and stress in the microexpressions 104 (and the microexpressions 192) and adapt the computation of baseline features 170 (and the test features 174) to, for example, assign low weight values (e.g., 3 out of 10) to those cues or remove them. In a particular example, the determinants or cues of fatigue and stress may include hanging eyelids, redder eyes, more swollen eyes, paler skin, or any other clues that would be considered as effects of fatigue or stress.

In one embodiment, the AI engine 114 may be configured to present a different set of test subjects 164 for each process of authenticating the user 102, so that the user 102 does not get used to the same test subject 164, thus, leading to the user 102 expressing microexpressions different than microexpressions 104 or fading microexpressions 104.

In one embodiment, the AI engine 114 may be configured to detect differences between synthetic and genuine microexpressions 104, 192. For example, the AI engine 114 may be trained by a first training dataset comprising images and/or videos of users labeled with synthetic microexpressions. Further in this example, the AI engine 114 may be trained by a second training dataset comprising images and/or videos of users labeled with genuine microexpressions. In this way, the AI engine 114 may be trained to detect differences between synthetic and genuine microexpressions 104, 192. As such, the AI engine 114 may be configured to detect deep-fake microexpressions.

Although, in FIG. 1, the AI engine 114 is illustrated in the computing device 110, one of ordinary skill in the art would recognize other embodiments. For example, the AI engine 114 may reside in a remote server, such as server 310 of FIG. 3, and the processor 112 may communicate the images 146, videos 148, and audio sounds 194 to the remote server for processing. Similarly, the images 188, videos 190, and audio sounds 198 may be communicated from the user device 176 to the remote server for processing.

Although, in FIG. 1, the camera 122 and microphone 123 are illustrated inside the computing device 110, it should be understood that the camera 122 and/or microphone 123 may be outside of the computing device 110, and communicatively coupled to the computing device 110. For example, the camera 122 may be a surveillance camera 122 installed in vicinity of the computing device 110. Similarly, the camera 182 microphone 196 may be outside of the user device 176, and communicatively coupled to the user device 176. For example, the camera 182 may be a surveillance camera 182.

Example Method for Authenticating a User Using Microexpressions

Figure 2:
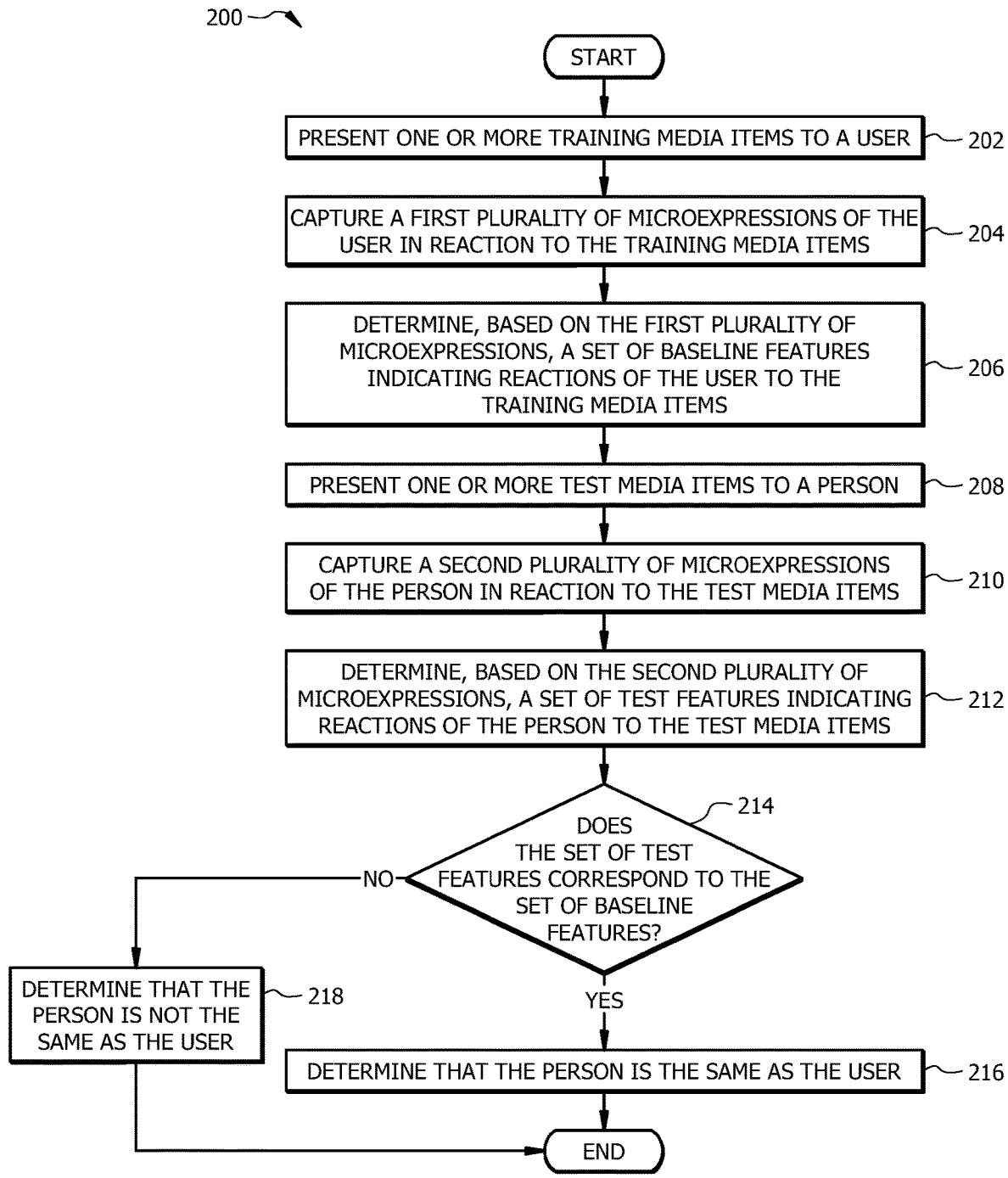
FIG. 2 illustrates an example flowchart of a method for capturing microexpressions expressed by a user, and leveraging the microexpressions for authenticating the user.

FIG. 2 illustrates an example flowchart of a method 200 for authenticating a user 102 using microexpressions. Modifications, additions, or omissions may be made to method 200. Method 200 may include more, fewer, or other steps. For example, steps may be performed in parallel or in any suitable order. While at times discussed as the system 100, processor 112, AI engine 114, feature extractor 116, or components of any of thereof performing steps, any suitable system or components of the system may perform one or more steps of the method 200. For example, one or more steps of method 200 may be implemented, at least in part, in the form of software instructions 128 of FIG. 1, stored on non-transitory, tangible, machine-readable media (e.g., memory 126 of FIG. 1) that when run by one or more processors (e.g., processor 112 of FIG. 1) may cause the one or more processors to perform steps 202-218.

Method 200 begins at step 202 where the AI engine 114 presents one or more training media items 152 to the user 102. For example, the AI engine 114 may present one or more training media items 152 to the user 102 using the display screen 118 and/or the speaker 120. The AI engine 114 may present one or more training media items 152 to the user 102 from one or more categories 158 or training subjects 154, similar to that described in FIG. 1.

At step 204, the AI engine 114 captures a first plurality of microexpressions 104 expressed by the user 102 in reaction to the presented training media items 152. During this process, the camera 122 captures one or more images 146 and/or videos 148 from the user 102, and communicates them to the AI engine 114. Similarly, the microphone 123 captures audio sound 194 made by the user 102, and communicates the captured audio sound 194 to the AI engine 114. The AI engine 114 processes the captured images 146, videos 148, and/or audio sound 194 to determine the microexpressions 104 expressed by user 102, similar to that described in FIG. 1.

At step 206, the AI engine 114 (via the feature extractor 116) determines, based on the first plurality of microexpressions 104, a set of baseline features 170 indicating reactions of the user 102 to the presented training media items 152. For example, the AI engine 114 may execute the feature extractor 116 by implementing the machine learning algorithms 130 to extract baseline features 170 from the microexpressions 104, similar to that described in FIG. 1. For example, the baseline features 170 may comprise visual (e.g., facial) features of the user 102, auditory features of the user 102, gestures performed by the user 102, and movements of the user 102 indicating reactions of the user 102 to the training media items 152. The AI engine 114 can use the baseline features 170 to authenticate the user 102 in an MFA process as described in steps 208 to 218 of method 200.

At step 208, the AI engine 114 presents one or more test media items 162 to a person 106. For example, assume that the person 106 is attempting to access a user account 184 that is associated with the user 102 at the user device 176. Upon detecting that the person 106 is attempting to access the user account 184, the AI engine 114 is triggered to presents one or more test media items 162 to the person 106. For example, the AI engine 114 may be integrated in (or added to) authentication technology for accessing the user account 184. The AI engine 114 may fetch one or more test media items 162 from the media database 132, and communicate them to the application 186 to be presented to the person 106 on the display screen 178 and/or the speaker 180. The AI engine 114 selects test media items 162 that are in the same categories 158 as the training subjects 154 used for establishing the baseline features 170 for the user 102, similar to that described above in FIG. 1.

At step 210, the AI engine 114 captures a second plurality of microexpressions 192 expressed by the person 106 in reaction to the presented test media items 162. In this process, the camera 182 captures one or more images 188 and/or videos 190 from the person 106 reacting to the presented test media items 162, and communicates the captured images 188 and/or videos 190 to the AI engine 114. Similarly, the microphone captures the audio sound 198 made by the person 106, and communicates the audio sound 198 to the AI engine 114. The AI engine 114 processes the images 188, videos 190, and/or the audio sound 198, and captures the second plurality of microexpressions 192, similar to that described above in FIG. 1.

At step 212, the AI engine 114 (via the feature extractor 116) determines, based on the second plurality of microexpressions 192, a set of test features 174 indicating reactions of the person 106 to the presented test media items 162 in step 208. For example, the AI engine 114 may execute the feature extractor 116 by implementing the machine learning algorithms 130 to extract test features 174 from the microexpressions 192, similar to that described in FIG. 1.

At step 214, the AI engine 114 determines whether the set of test features 174 corresponds to the set of baseline features 170. In this process, the AI engine 114 compares each test feature 174 with its corresponding baseline feature 170. In each comparison, the AI engine 114 determines a sub-confidence score 140 that corresponds to a difference between a numerical value associated with a baseline feature 170 and another numerical value associated with a corresponding test feature 174. The AI engine 114 determines the sub-confidence scores 140, similar to that described above in FIG. 1. The AI engine 114 calculated the confidence score 142 from the sub-confidence scores 140, similar to that described above in FIG. 1. If the AI engine 114 determines that the set of test features 174 corresponds to the set of baseline features 170, method 200 proceeds to step 216. Otherwise, method 200 proceeds to step 218. At step 216, the AI engine 114 determines that the person 106 is the same as the user 102, and authenticates the user 102 to access the user account 184.

At step 218, the AI engine 114 determines that the person is not the same as the user 102. In this case, for example, the AI engine 114 may send an alert to the user device 176 indicating an unauthorized attempt to access the user account 184. In another example, the AI engine 114 may lock the user account 184 after more than a threshold number (e.g., one, three, or any appropriate number) of performing the steps 202 to 214 in a threshold period of time (e.g., above ten unauthorized (or failed) attempts in five minutes, or any other threshold number of unauthorized attempts in any appropriate threshold period of time). In another example, the AI engine 114 may use other identity verification methods to determine that the person 106 is the same as the user 102, such as sending a passcode to a phone number associated with the user 102 and the user account 184.

Figure 3:
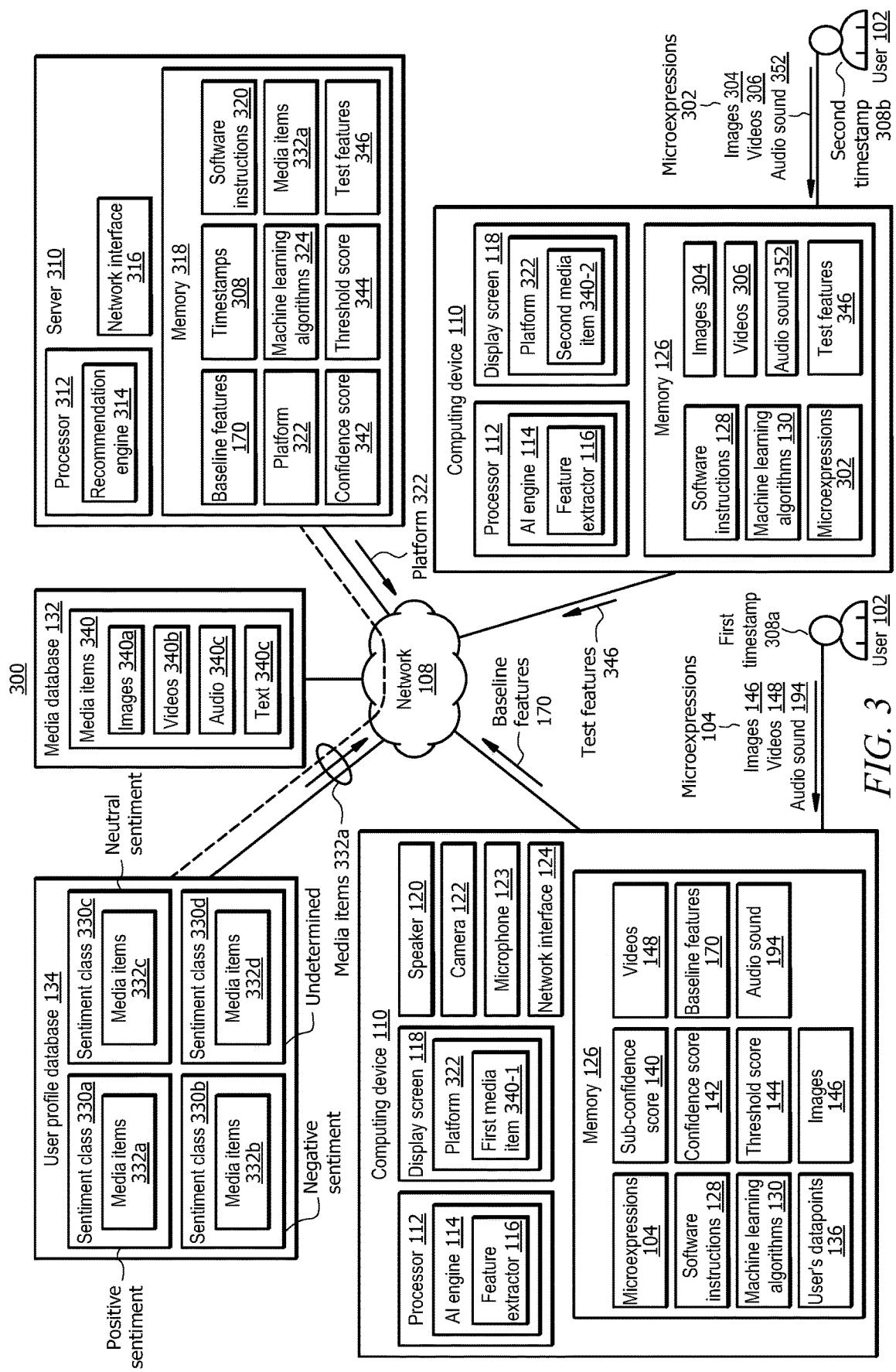
FIG. 3 illustrates an embodiment of a system configured to capture microexpressions expressed by a user, and leverage the microexpressions for media customization presented to the user.

Example System for Leveraging Microexpressions in Media Presentation Customization Based on User's Sentiments FIG. 3 illustrates an embodiment of system 300 that is configured to leverage microexpressions of a user 102 in media presentation customization based on sentiments of the user 102 reacting to media items 340. In one embodiment, the system 300 may share one or more components with the system 100 of FIG. 1. For example, system 300 comprises computing device 110 that includes the processor 112 in signal communication with the memory 126, where the processor 112 is configured to extract baseline features 170 from a set of microexpressions 104, similar to that described in FIG. 1. System 300 may further comprise a server 310 communicatively coupled with other components of system 300 via network 108. The server 310 comprises a processor 312 in signal communication with a memory 318. Memory 318 comprises software instructions 320 that when executed by the processor 312, cause the processor 312 to perform one or more functions described herein. For example, when the software instructions 320 are executed, the processor 312 executes the recommendation engine 314 to customize contents of a particular platform 322 to include one or more media items 332*a* from a user sentiment class 330*a* that the user 102 has expressed positive sentiments. In other embodiments, system 300 may not have all of the components listed and/or may have other elements instead of, or in addition to, those listed above.

In general, system 300 (at the computing device 110) presents a first media item 340-1 to the user 102 on a particular platform 322. For example, the particular platform 322 may comprise at least one of an organization's website, a shopping website, an email box, a message board, or any interface on which the first media item 340-1 can be presented on. The first media item 340-1 may include, for example, at least one of an image 340*a*, a video 340*b*, an audio 340*c*, and a text 340*d*. The AI engine 114 captures a first set of microexpressions 104 of the user 102 reacting to the first media item 340-1. For example, the AI engine 114 may trigger the camera 122 to capture one or more images 146 and/or videos 148 from the user 102. The AI engine 114 extracts, from the captured one or more images 146 and/or videos 148, a set of baseline features 170 from the first set of microexpressions 104, where the set of baseline features 170 indicates the reaction of the user 102 to the first media item 340-1. The AI engine 114 communicates the set of baseline features 170 to the recommendation engine 314 for processing. The recommendation engine 314 determines a corresponding sentiment that the first media item 340-1 elicits from the user 102. For example, the recommendation engine 314 determines whether the first media item 340-1 elicits positive, negative, or neutral sentiment. In this process, the recommendation engine 314 compares the set of baseline features 170 with a training dataset comprising features 170 associated with microexpressions 104 labeled with various sentiments, e.g., positive, negative, or neutral sentiment. For example, assume that the recommendation engine 314 determines that the first media item 340-1 elicits positive sentiment from the user 102. In response, the recommendation engine 314 classifies the first media item 340-1 into a first sentiment class 330a, indicating that the first media item 340-1 elicits positive sentiment from the user 102. The recommendation engine 314 may adjust the contents of the particular platform 322 to include media items 332a from the sentiment class 330a that elicit positive sentiment from the user 102.

Server

Server 310 is generally a server or any other device configured to process data and communicate with computing devices (e.g., computing devices 110), and databases (e.g., media database 132 and user profile database 134) via the network 108. In one example, server 310 may be a backend server 310 associated with the platform 322 that is used to oversee operations of the platform 322, monitor feedback of users 102 visiting the platform 322, among others. The server 310 is generally configured to oversee operations of the processor 312 as described further below.

Processor 312 comprises one or more processors operably coupled to the memory 318. The processor 312 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 312 may be a programmable logic device, a microcontroller, a microprocessor, or any suitable combination of the preceding. The one or more processors are configured to process data and may be implemented in hardware or software. For example, the processor 312 may be 8-bit, 16-bit, 32-bit, 64-bit, or of any other suitable architecture. The processor 312 may include an arithmetic logic unit (ALU) for performing arithmetic and logic operations, processor 312 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 320) to implement the recommendation engine 314. In this way, processor 312 may be a special-purpose computer designed to implement the functions disclosed herein. In an embodiment, the processor 312 is implemented using logic units, FPGAs, ASICs, DSPs, or any other suitable hardware. The processor 312 is configured to operate as described in FIGS. 3 and 4. For example, the processor 312 may be configured to perform one or more steps of method 400 as described in FIG. 4.

Network interface 316 is configured to enable wired and/or wireless communications (e.g., via network 108). The network interface 316 is configured to communicate data between the server 310 and other devices (e.g., computing devices 110), databases (e.g., media database 132 and user profile database 134), systems, or domains. For example, the network interface 316 may comprise a WIFI interface, a local area network (LAN) interface, a wide area network (WAN) interface, a modem, a switch, or a router. The processor 312 is configured to send and receive data using the network interface 316. The network interface 316 may be configured to use any suitable type of communication protocol as would be appreciated by one of ordinary skill in the art.

Memory 318 may be volatile or non-volatile and may comprise a read-only memory (ROM), random-access memory (RAM), ternary content-addressable memory (TCAM), dynamic random-access memory (DRAM), and static random-access memory (SRAM). Memory 318 may be implemented using one or more disks, tape drives, solid-state drives, and/or the like. Memory 318 is operable to store the software instructions 320, media items 332a, machine learning algorithm 324, baseline features 170, test features 346, confidence score 342, threshold score 344, timestamps 308, platform 322, and/or any other data or instructions. The software instructions 320 may comprise any suitable set of instructions, logic, rules, or code operable to execute the processor 312.

Recommendation Engine and its Operations

Recommendation engine 314 may be implemented by the processor 312 executing software instructions 320, and is generally configured to determine a corresponding sentiment class 330 that one or more media items 340 presented to the user 102 on the platform 322 belongs. In one embodiment, the recommendation engine 314 may be implemented using classification machine learning algorithms, such as support vector machine, neural network, random forest, k-means clustering, etc.

To determine a corresponding sentiment class 330 that one or more media item presented to the user 102 on the platform 322 belongs, the recommendation engine 314 receives the set of baseline features 170 from the AI engine 114 via network 108. The recommendation engine 314 compares the received set of baseline features 170 with a training dataset comprising features 170 associated with microexpressions 104 that are labeled with various sentiments, including positive, negative, and neutral sentiments. In this process, the recommendation engine 314 may compare numerical values representing the set of baseline features 170 with numerical values representing the features 170 from the training dataset. The recommendation engine 314 determines whether each baseline feature 170 is within a threshold percentage from a corresponding feature 170 from the training dataset. For example, assuming that the recommendation engine 314 determines that more than a threshold percentage of the set of baseline features 170 correspond to more than the threshold percentage of features 170 from the training dataset that are labeled with the positive sentiment, the recommendation engine 314 determines that the set of baseline features 170 are associated with the positive sentiment. In this manner, the recommendation engine 314 determines the associations and relationships between baseline features 170 and their corresponding sentiments expressed by the user 102.

The recommendation engine 314 determines to which sentiment class 330 the set of baseline features 170 belongs, where each sentiment class 330 is associated with a particular emotion. The first sentiment class 330a is associated with a positive sentiment that indicates positive emotions expressed by the user 102, such as happiness and joy. For example, if the recommendation engine 314 determines that the set of baseline features 170 represents a positive reaction to the first media item 340-1, such as laughing, the recommendation engine 314 determines that the first media item 340-1 belongs to the first sentiment class 330a. The second sentiment class 330b is associated with a negative sentiment that indicates negative emotions expressed by the user 102, such as sadness. For example, if the recommendation engine 314 determines that the set of baseline features 170 represents a negative reaction to the first media item 340-1, such as frowning, the recommendation engine 314 determines that the first media item 340-1 belongs to the second first sentiment class 330b. The third sentiment class 330a is associated with the neutral sentiment that indicates neutral emotions expressed by the user 102.

For example, assume that recommendation engine 314 receives the set of baseline features 170 indicating the reaction of the user 102 to the first media item 340-1. In this example, if the recommendation engine 314 determines that the set of baseline features 170 is associated with the positive sentiment (i.e., positive emotions are expressed by the user 102 in reaction to the first media item 340-1), the recommendation engine 314 classifies the first media item 340-1 into the first sentiment class 330a. If the recommendation engine 314 determines that the set of baseline features 170 is associated with the negative sentiment, the recommendation engine 314 classifies the first media item 340-1 into the second sentiment class 330b. If the recommendation engine 314 determines that the set of baseline features 170 is associated with the neutral sentiment, the recommendation engine 314 classifies the first media item 340-1 into the third sentiment class 330c. In some examples, if the recommendation engine 314 determines that there is not enough data in the set of baseline features 170 indicating a sentiment of the user 102 in reaction to the first media item 340-1, the recommendation engine 314 classifies the first media item 340-1 into a fourth class 332d indicating that the user's sentiment with respect to the first media item 340-1 is undetermined.

In one embodiment, the recommendation engine 314 may assign a confidence score 342 to the determination of to which sentiment class 330 the first media item 340-1 belongs. The confidence score 342 may represent a probability percentage that the determination of to which sentiment class 330 the first media item 340-1 belongs is accurate. The confidence score 342 may further represent the attention level or engagement level of the user 102 reacting to a media item 340. For example, with respect to the first media item 340-1, if the confidence score 342 is more than a threshold score 344 (e.g., 85%, 90%, etc.), the recommendation engine 314 classifies the first media item 340-1 into the corresponding sentiment class 330. As such, the recommendation engine 314 determines a corresponding sentiment class 332 that one or more media items 340 presented to the user 102 on the platform 322.

Customizing the Platform

In one embodiment, the recommendation engine 314 may recommend to customize the platform 322 to include one or more media items 332a from the sentiment class 330a. For example, the recommendation engine 314 may recommend to developers of the platform 322 to include one or more media items 332a when the user 102 visits the platform 322. In another, the recommendation engine 314 may recommend to customize the platform 322 to augment or adjust contracts, sizes, colors, and other features of the media items 340 on the platform 322. In one embodiment, the process of customization of the platform 322 may be computerized and performed by the recommendation engine 314 to dynamically customize the platform 322 based on historical sentiments of the user 102 reacting to the media items presented on the platform 322.

Triggering a Detectable Action in Response to Detecting User's Sentiment in Reacting to Media Items In one embodiment, the recommendation engine 314 may trigger a detectable action in response to determining that one or more users 102 expressed a negative sentiment to one or more particular media items 340 presented on the platform 322. For example, assume that the one or more users 102 are one or more employees of an organization, and the one or more users 102 expressed the negative sentiment to an email sent to the one or more users 102. Also, assume that other employees of the organization have expressed the positive sentiment to that email. In such cases, the recommendation engine 314 may determine that the detected negative sentiment from the one or more users 102 is an anomaly compared to the other users 102. As such, the recommendation engine 314 may send an applicable notification to authorized users 102 (e.g., managers or supervisors of the one or more users 102) to address the anomaly, e.g., for example, to determine a source or cause of the anomaly.

Operational Flow

Capturing Microexpressions of a User Reacting a First Media Item at a First Timestamp The operational flow of system 300 begins when the user 102 visits the platform 322 at a first timestamp 308a, where the first media item 340-1 is presented on the platform 322 on the computing device 110. The AI engine 114 captures a first set of microexpressions 104 from the user 102 reacting to a first media item 340-1 presented on the platform 322, similar to that described in FIGS. 1 and 2. The AI engine 114 communicates the set of baseline features 170 to the recommendation engine 314 for processing. By analyzing the set of baseline features 170, the recommendation engine 314 determines a corresponding sentiment class 332 that the first media item 340-1 belongs to, similar to that described above.

Capturing Microexpressions of a User Reacting to a Second Media Item at a Second Timestamp For example, assume that during a second visit of the user 102 to the platform 322 (e.g., at the second timestamp 308b), the second media item 340-2 is presented to the user 102 on the platform 322. The AI engine 114 captures the second set of microexpressions 302 of the user 102 reacting to the second media item 340-2. The AI engine 114 extracts a set of test features 346 from the second set of microexpressions 302, similar to that described above in FIGS. 1 and 2, where the set of test features 346 indicates the reaction of the user 102 to the second media item 340-2. For example, the AI engine 114 receives one or more images 348, videos 350, and/or audio sounds 352, respectively, from the camera 122 and microphone 123. From the one or more images 348, videos 350, and/or audio sounds 352, the AI engine 114 extracts the second set of microexpressions 302, similar to that described above in FIGS. 1 and 2 with respect to extracting the first set of microexpressions 104. The AI engine 114 communicates the set of test features 346 to the recommendation engine 314 via network 108.

Determining a Sentiment Classification of a Second Media Item

In one embodiment, the recommendation engine 314 may determine a sentiment classification of a second media item 340-2 by comparing baseline features 170 with test features 346 extracted from the second set of microexpressions 302 captured during a second visit of the user 102 to the platform 322. In this process, the recommendation engine 314 compares the set of test features 346 with the set of baseline features 170 that indicates the reaction of the user 102 to the first media item 340-1 classified in the sentiment class 330a. The recommendation engine 314 determines whether the second set of test features 346 corresponds to the set of baseline features 170, similar to that described above in FIG. 1. For example, recommendation engine 314 may perform following operations for each test feature 346. The recommendation engine 314 determines a first numerical value representing a test feature 346, and a second numerical value representing a corresponding baseline feature 170. The recommendation engine 314 compares the first numerical value with the second numerical value. The recommendation engine 314 determines whether the first numerical value is within a threshold range (e.g., ±5%, ±10%, etc.) from the second numerical value. If the recommendation engine 314 determines that the first numerical value is within the threshold range from the second numerical value, the recommendation engine 314 determines that the test feature 346 corresponds to the corresponding baseline feature 170. Otherwise, the recommendation engine 314 determines that the test feature 346 does not correspond with the corresponding baseline feature 170. The recommendation engine 314 determines whether more than a threshold percentage of the test features 346 (e.g., above 80%, 85%, or any suitable threshold percentage) correspond with the above threshold percentage of the baseline features 170. If the recommendation engine 314 determines that more than the threshold percentage of the second set of test features 346 correspond with the above threshold percentage of the baseline features 170, the recommendation engine 314 determines that the second set of test features 346 corresponds with the set of baseline features 170. If the recommendation engine 314 determines that the second set of test features 346 corresponds with the set of baseline features 170, the recommendation engine 314 classifies the second media item into the first sentiment class 332a. Otherwise, the recommendation engine 314 may determine a corresponding sentiment class 330 that the second media item 340-2 belongs to similar to that described above with respect to the first media item 340-1.

Although, in FIG. 3, the AI engine 114 is illustrated in the computing device 110, one of ordinary skill in the art would recognize other embodiments. For example, the AI engine 114 may reside in the server 310, and the processor 112 may communicate the images 146, videos 148, and audio sounds 194 of the user 102 captured at the first timestamp 308a to the server 310 for processing. Similarly, the processor 112 may communicate the images 348, videos 350, and audio sounds 352 of the user 102 captured at the second timestamp 308b to the server 310 for processing.

Figure 4:
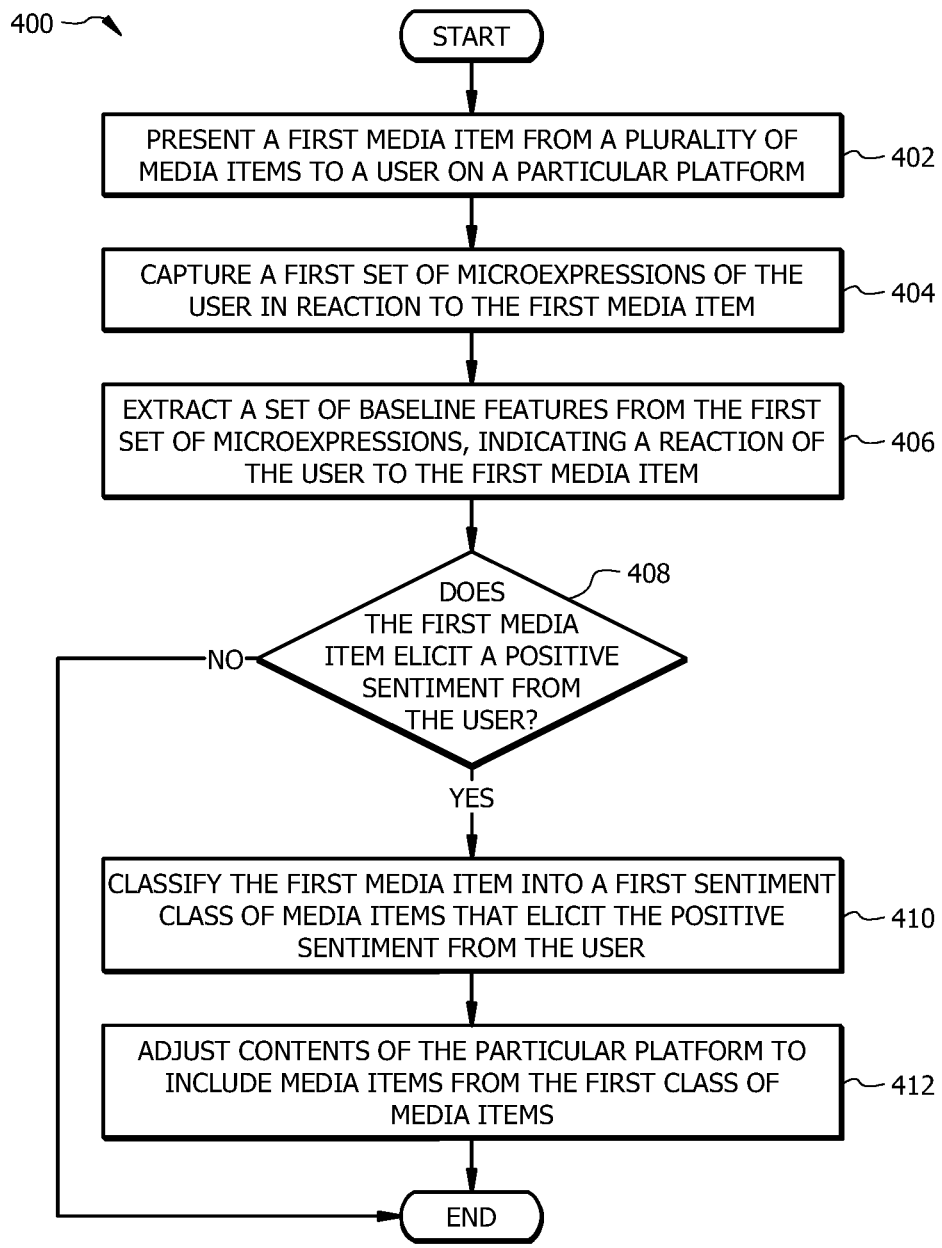
FIG. 4 illustrates an example flowchart of a method for capturing microexpressions expressed by a user, and leveraging the microexpressions for media customization presented to the user.

Example Method for Leveraging Microexpressions in Media Presentation Customization Based on User's Sentiments FIG. 4 illustrates an example flowchart of a method 400 for leveraging microexpressions 104, 302 of a user 102 in media presentation customization based on sentiments of the user 102 reacting to media items 340. Modifications, additions, or omissions may be made to method 400. Method 400 may include more, fewer, or other steps. For example, steps may be performed in parallel or in any suitable order. While at times discussed as the system 300, processor 112, processor 312, AI engine 114, recommendation engine 314, or components of any of thereof performing steps, any suitable system or components of the system may perform one or more steps of the method 400. For example, one or more steps of method 400 may be implemented, at least in part, in the form of software instructions 128 and 320 of FIG. 3, respectively, stored on non-transitory, tangible, machine-readable media (e.g., memories 126 and 318 of FIG. 3) that when run by one or more processors (e.g., processor 112 and 312 of FIG. 3) may cause the one or more processors to perform steps 402-412.

Method 400 begins at step 402 where a first media item 340-1 from a plurality of media items 340 is presented to the user on a particular platform 322. For example, the first media item 340-1 may comprise at least one of an image 340a, a video 340b, an audio 340c, and a text 340d. In a particular example, the first media item 340-1 may comprise a message (e.g., an email, a text message, etc.), an announcement, a mission statement, and the like. For example, the particular platform 322 may comprise at least one of an organization's website, a shopping website, an email box, a message board, or any interface on which the first media item 340-1 can be presented on.

At step 404, the AI engine 114 captures a first plurality of microexpressions 104 expressed by the user 102 in reaction to the first media item 340-1, similar to that described in FIG. 3 and step 202 of FIG. 2.

At step 406, the AI engine 114 extracts a set of baseline features 170 indicating reactions of the user 102 to the presented first media item 340-1, based on the first set of microexpressions 104, similar to that described in FIG. 3 and step 204 of FIG. 2.

At step 408, the recommendation engine 314 determines whether the first media item 340-1 elicit a positive sentiment from the user 102. In this process, the recommendation engine 314 determines a corresponding sentiment class 332 that the first media item 340-1 belongs to, similar to that described above in FIG. 3. If it is determined that the first media item 340-1 elicits positive sentiment from the user 102, method 400 proceeds to step 410. Otherwise, method 400 terminates.

At step 410, the recommendation engine 314 classifies the first media item 340-1 into the first sentiment class 332a indicating that the first media item 340-1 elicits positive sentiment from the user 102.

At step 412, the recommendation engine 314 adjusts the particular platform 322 to include media items from the first sentiment class 332a.

In one embodiment, the AI engine 114 may be configured to leverage time-series of microexpressions 104 for purpose of other use cases besides identity validation and media presentation customization described herein. For example, the AI engine 114 may extract microexpressions 104 to recommend rest/anxiety breaks. In this example, the AI engine 114 may detect the determinants or cues of fatigue and stress from the images 146 and/or videos 148, similar to that described above in FIGS. 1 and 2. If the determinants of fatigue and stress are represented by numerical values more than a threshold value in baseline features 170, the AI engine 114 may send a notifying message to the user 102 recommending a rest/anxiety break.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for customizing a media presentation based on user's sentiments, comprising:
   a memory operable to store a plurality of media items comprising at least one of an image, a video, an audio, and a text; and
   a processor, operably coupled with the memory, configured to:
      present, at a first timestamp, a first media item from the plurality of media items to the user on a particular platform, wherein the particular platform comprises a website;
   a camera, operably coupled with the processor and the memory, configured to:
      in response to presenting the first media item to the user, capture one or more first images of a user reacting to the first media item; and
      communicate the one or more first images to the processor;
   the processor is further configured to:
      capture, from the one or more first images, a first set of microexpressions of the user reacting to the first media item;
      extract a set of baseline features from the first set of microexpressions, indicating a reaction of the user to the first media item, wherein:
         the set of baseline features represents one or more of facial features of the user and a gesture performed by the user reacting to the first media item; and
         the reaction of the user indicates an emotional response of the user to the first media item;
      based at least in part upon the set of baseline features, determine whether the first media item elicits a positive sentiment or a negative sentiment from the user, wherein:
         the positive sentiment indicates positive emotions expressed by the user, and
         the negative sentiment indicates negative emotions expressed by the user;
      determine that the first media item elicits the positive sentiment from the user;
      in response to determining that the first media item elicits the positive sentiment from the user, classify the first media item into a first class of media items that elicit the positive sentiment from the user;
      identify at least one other media item from the first class of media items that elicit the positive sentiment from the user, wherein the at least other media item comprises a media item that presents an augmented representation of a subject associated with the first media item; and
      add the identified at least one other media item to the particular platform.

2. The system of claim 1, wherein determining whether the first media item elicits the positive sentiment or the negative sentiment from the user, based at least in part upon the set of baseline features, comprises:
   comparing the first set of microexpressions with microexpressions that are labeled with the positive sentiment;
   determining whether the first set of microexpressions corresponds with the microexpressions labeled with the positive sentiment;
   in response to determining that the first set of microexpressions corresponds with the microexpressions labeled with the positive sentiment, determining that the first set of microexpressions is associated with the positive sentiment; and
   in response to determining that the first set of microexpressions is associated with the positive sentiment, determining that the set of baseline features is associated with the positive sentiment.

3. The system of claim 1, wherein:
   the processor is further configured to:
      present, at a second timestamp, a second media item from the plurality of media items to the user on the particular platform;
   the camera is further configured to:
      capture one or more second images of the user reacting to the second media item; and
      communicate the one or more second images to the processor;
   the processor is further configured to:
      capture, from the one or more second images, a second set of microexpressions of the user reacting to the second media item;
      extract a set of test features from the second set of microexpressions, indicating a reaction of the user to the second media item, wherein the set of test features represents one or more of facial features of the user and a gesture performed by the user reacting to the second media item;
      compare the second set of microexpressions with microexpressions that are labeled with the negative sentiment;
      determine whether the second set of microexpressions corresponds with the microexpressions labeled with the negative sentiment;
      in response to determining that the second first set of microexpressions corresponds with the microexpressions labeled with the negative sentiment, determine that the second media item elicits the negative sentiment from the user; and
      in response to determining that the second media item elicits the negative sentiment from the user, classify the second media item into a second class of media items that elicit the negative sentiment from the user.

4. The system of claim 1, wherein the processor is further configured to:
   present, at a third timestamp, a third media item from the plurality of media items to the user on the particular platform;
   capture a third set of microexpressions of the user reacting to the third media item;
   extract a second set of test features from the third set of microexpressions, indicating a reaction of the user to the third media item, wherein the second set of test features represents one or more of facial features of the user and a gesture performed by the user reacting to the third media item;
   compare the second set of test features with the set of baseline features, wherein comparing the second set of test features with the set of baseline features comprises:
      for each test feature from the second set of test features:

determining a first numerical value representing the test feature;
determining a second numerical value representing a correspond baseline feature from the set of baseline feature;
comparing the first numerical value with the second numerical value;
determining whether the first numerical value is within a threshold range from the second numerical value; and
in response to determining that the first numerical value is within the threshold range from the second numerical value, determining that the test feature corresponds with the corresponding baseline feature;

determine whether more than a threshold percentage of the second set of test features correspond with more than the threshold percentage of the set of baseline features;
in response to determining that the more than the threshold percentage of the second set of test features correspond with more than the threshold percentage of the set of baseline features, determine that the second set of test features corresponds with the set of baseline features; and
in response to determining that the second set of test features corresponds with the set of baseline features, classify the third media item into the first class of media items.

5. The system of claim 1, further comprising a microphone, operably coupled with the processor, configured to:
in response to presenting the first media item to the user, capture an audio sound made by the user; and
communicate the audio sound to the processor;
the processor is further configured to extract, from the audio sound, a set of auditory microexpressions from the user reacting to the first media item, wherein:
the set of auditory microexpressions represents auditory clues expressed by the user indicating the reaction of the user to the first media item; and
the set of auditory microexpressions is a portion of the first set of microexpressions.

6. The system of claim 1, wherein capturing the first set of microexpressions of the user reacting to the first media item, comprises at least one of:
capturing facial microexpressions from the user;
capturing verbal auditory clues from the user comprising at least a word uttered by the user; and
capturing non-verbal auditory clues from the user comprising an audio sound of laughing.

7. The system of claim 1, wherein the set of baseline features further represents one or more of a movement of the user and an audio sound made by the user.

8. A method for customizing a media presentation based on user's sentiments, comprising:
presenting, at a first timestamp, a first media item from a plurality of media items to the user on a particular platform, wherein:
the particular platform comprises a website; and
the plurality of media items comprises at least one of an image, a video, an audio, and a text;
in response to presenting the first media item to the user, capturing one or more first images of a user reacting to the first media item;
capturing, from the one or more first images, a first set of microexpressions of the user reacting to the first media item;
extracting a set of baseline features from the first set of microexpressions, indicating a reaction of the user to the first media item, wherein:
the set of baseline features represents one or more of facial features of the user and a gesture performed by the user reacting to the first media item; and
the reaction of the user indicates an emotional response of the user to the first media item;
based at least in part upon the set of baseline features, determining whether the first media item elicits a positive sentiment or a negative sentiment from the user, wherein:
the positive sentiment indicates positive emotions expressed by the user, and
the negative sentiment indicates negative emotions expressed by the user;
determining that the first media item elicits the positive sentiment from the user;
in response to determining that the first media item elicits the positive sentiment from the user, classifying the first media item into a first class of media items that elicit the positive sentiment from the user;
identifying at least one other media item from the first class of media items that elicit the positive sentiment from the user, wherein the at least other media item comprises a media item that presents an augmented representation of a subject associated with the first media item; and
adding the identified at least one other media item to the particular platform.

9. The method of claim 8, wherein determining whether the first media item elicits the positive sentiment or the negative sentiment from the user, based at least in part upon the set of baseline features, comprises:
comparing the first set of microexpressions with microexpressions that are labeled with the positive sentiment;
determining whether the first set of microexpressions corresponds with the microexpressions labeled with the positive sentiment;
in response to determining that the first set of microexpressions corresponds with the microexpressions labeled with the positive sentiment, determining that the first set of microexpressions is associated with the positive sentiment; and
in response to determining that the first set of microexpressions is associated with the positive sentiment, determining that the set of baseline features is associated with the positive sentiment.

10. The method of claim 8, further comprising:
presenting, at a second timestamp, a second media item from the plurality of media items to the user on the particular platform;
capturing one or more second images of the user reacting to the second media item;
capturing, from the one or more second images, a second set of microexpressions of the user reacting to the second media item;
extracting a set of test features from the second set of microexpressions, indicating a reaction of the user to the second media item, wherein the set of test features represents one or more of facial features of the user and a gesture performed by the user reacting to the second media item;
comparing the second set of microexpressions with microexpressions that are labeled with the negative sentiment;

determining whether the second set of microexpressions corresponds with the microexpressions labeled with the negative sentiment;

in response to determining that the second first set of microexpressions corresponds with the microexpressions labeled with the negative sentiment, determining that the second media item elicits the negative sentiment from the user; and in response to determining that the second media item elicits the negative sentiment from the user, classifying the second media item into a second class of media items that elicit the negative sentiment from the user.

11. The method of claim 8, further comprising:

presenting, at a third timestamp, a third media item from the plurality of media items to the user on the particular platform;

capturing a third set of microexpressions of the user reacting to the third media item;

extracting a second set of test features from the third set of microexpressions, indicating a reaction of the user to the third media item, wherein the second set of test features represents one or more of facial features of the user and a gesture performed by the user reacting to the third media item;

comparing the second set of test features with the set of baseline features, wherein comparing the second set of test features with the set of baseline features comprises:

for each test feature from the second set of test features:

determining a first numerical value representing the test feature;

determining a second numerical value representing a correspond baseline feature from the set of baseline feature;

comparing the first numerical value with the second numerical value;

determining whether the first numerical value is within a threshold range from the second numerical value; and in response to determining that the first numerical value is within the threshold range from the second numerical value, determining that the test feature corresponds with the corresponding baseline feature;

determining whether more than a threshold percentage of the second set of test features correspond with more than the threshold percentage of the set of baseline features;

in response to determining that the more than the threshold percentage of the second set of test features correspond with more than the threshold percentage of the set of baseline features, determining that the second set of test features corresponds with the set of baseline features; and in response to determining that the second set of test features corresponds with the set of baseline features, classifying the third media item into the first class of media items.

12. The method of claim 8, further comprising:

in response to presenting the first media item to the user, capturing an audio sound made by the user; and extracting, from the audio sound, a set of auditory microexpressions from the user reacting to the first media item, wherein:

the set of auditory microexpressions represents auditory clues expressed by the user indicating the reaction of the user to the first media item; and the set of auditory microexpressions is a portion of the first set of microexpressions.

13. The method of claim 8, wherein capturing the first set of microexpressions of the user reacting to the first media item, comprises at least one of:

capturing facial microexpressions from the user;

capturing verbal auditory clues from the user comprising at least a word uttered by the user; and capturing non-verbal auditory clues from the user comprising an audio sound of laughing.

14. The method of claim 8, further comprising:

determining a first sentiment expressed by a first set of users reacting to the first media item;

determining a second sentiment expressed by a second set of users reacting to the first media item;

determining that the first sentiment is an anomaly compared to the second sentiment; and triggering a detectable action to address the anomaly, comprising communicating a message to authorities supervising the first set of users indicating the anomaly associated with the first set of users reacting to the first media item.

15. A computer program comprising executable instructions stored in a non-transitory computer-readable medium that when executed by a processor causes the processor to:

present, at a first timestamp, a first media item from the plurality of media items to the user on a particular platform, wherein:

the particular platform comprises a website; and the plurality of media items comprises at least one of an image, a video, an audio, and a text;

in response to presenting the first media item to the user, capture one or more first images of a user reacting to the first media item;

capture, from the one or more first images, a first set of microexpressions of the user reacting to the first media item;

extract a set of baseline features from the first set of microexpressions, indicating a reaction of the user to the first media item, wherein:

the set of baseline features represents one or more of facial features of the user and a gesture performed by the user reacting to the first media item; and the reaction of the user indicates an emotional response of the user to the first media item;

based at least in part upon the set of baseline features, determine whether the first media item elicits a positive sentiment or a negative sentiment from the user, wherein:

the positive sentiment indicates positive emotions expressed by the user, and the negative sentiment indicates negative emotions expressed by the user;

determine that the first media item elicits the positive sentiment from the user;

in response to determining that the first media item elicits the positive sentiment from the user, classify the first media item into a first class of media items that elicit the positive sentiment from the user;

identify at least one other media item from the first class of media items that elicit the positive sentiment from the user, wherein the at least other media item comprises a media item that presents an augmented representation of a subject associated with the first media item; and add the identified at least one other media item to the particular platform.

16. The computer program of claim 15, wherein determining whether the first media item elicits the positive sentiment or the negative sentiment from the user, based at least in part upon the set of baseline features, comprises:
- comparing the first set of microexpressions with microexpressions that are labeled with the positive sentiment;
- determining whether the first set of microexpressions corresponds with the microexpressions labeled with the positive sentiment;
- in response to determining that the first set of microexpressions corresponds with the microexpressions labeled with the positive sentiment, determining that the first set of microexpressions is associated with the positive sentiment; and
- in response to determining that the first set of microexpressions is associated with the positive sentiment, determining that the set of baseline features is associated with the positive sentiment.

17. The computer program of claim 15, wherein the instructions when executed by the processor, further cause the processor to:
- present, at a second timestamp, a second media item from the plurality of media items to the user on the particular platform;
- capture one or more second images of the user reacting to the second media item;
- capture, from the one or more second images, a second set of microexpressions of the user reacting to the second media item;
- extract a set of test features from the second set of microexpressions, indicating a reaction of the user to the second media item, wherein the set of test features represents one or more of facial features of the user and a gesture performed by the user reacting to the second media item;
- compare the second set of microexpressions with microexpressions that are labeled with the negative sentiment;
- determine whether the second set of microexpressions corresponds with the microexpressions labeled with the negative sentiment;
- in response to determining that the second first set of microexpressions corresponds with the microexpressions labeled with the negative sentiment, determine that the second media item elicits the negative sentiment from the user; and
- in response to determining that the second media item elicits the negative sentiment from the user, classify the second media item into a second class of media items that elicit the negative sentiment from the user.

18. The computer program of claim 15, wherein the instructions when executed by the processor, further cause the processor to:
- present, at a third timestamp, a third media item from the plurality of media items to the user on the particular platform;
- capture a third set of microexpressions of the user reacting to the third media item;
- extract a second set of test features from the third set of microexpressions, indicating a reaction of the user to the third media item, wherein the second set of test features represents one or more of facial features of the user and a gesture performed by the user reacting to the third media item;
- compare the second set of test features with the set of baseline features, wherein comparing the second set of test features with the set of baseline features comprises:
  - for each test feature from the second set of test features:
    - determining a first numerical value representing the test feature;
    - determining a second numerical value representing a correspond baseline feature from the set of baseline feature;
    - comparing the first numerical value with the second numerical value;
    - determining whether the first numerical value is within a threshold range from the second numerical value; and
    - in response to determining that the first numerical value is within the threshold range from the second numerical value, determining that the test feature corresponds with the corresponding baseline feature;
  - determine whether more than a threshold percentage of the second set of test features correspond with more than the threshold percentage of the set of baseline features;
  - in response to determining that the more than the threshold percentage of the second set of test features correspond with more than the threshold percentage of the set of baseline features, determine that the second set of test features corresponds with the set of baseline features; and
  - is response to determining that the second set of test features corresponds with the set of baseline features, classify the third media item into the first class of media items.

19. The computer program of claim 15, further comprising a microphone, operably coupled with the processor, configured to:
- in response to presenting the first media item to the user, capture an audio sound made by the user; and
- communicate the audio sound to the processor;
- the processor is further configured to extract, from the audio sound, a set of auditory microexpressions from the user reacting to the first media item, wherein:
  - the set of auditory microexpressions represents auditory clues expressed by the user indicating the reaction of the user to the first media item; and
  - the set of auditory microexpressions is a portion of the first set of microexpressions.

20. The computer program of claim 15, wherein capturing the first set of microexpressions of the user reacting to the first media item, comprises at least one of:
- capturing facial microexpressions from the user;
- capturing verbal auditory clues from the user comprising at least a word uttered by the user; and
- capturing non-verbal auditory clues from the user comprising an audio sound of laughing.

* * * * *

UNITED STATES PATENT AND TRADEMARK OFFICE
CERTIFICATE OF CORRECTION

PATENT NO. : 11,468,713 B2
APPLICATION NO. : 17/189463
DATED : October 11, 2022
INVENTOR(S) : Michael Emil Ogrinz et al.

It is certified that error appears in the above-identified patent and that said Letters Patent is hereby corrected as shown below:

On the Title Page

In Item (54), after, "MEDIA PRESENTATION BASED ON," please delete the word "USERS#" and please insert -- USERS' --, therefor.

In the Specification

Column 1, Line 4, after, "MEDIA PRESENTATION BASED ON," please delete the word "USERS#" and please insert -- USERS' --, therefor.

Signed and Sealed this
Sixth Day of December, 2022

Katherine Kelly Vidal
*Director of the United States Patent and Trademark Office*